United States Patent
Kito

(10) Patent No.: US 8,898,343 B2
(45) Date of Patent: Nov. 25, 2014

(54) INFORMATION PROCESSING APPARATUS AND CONTROL METHOD THEREOF

(71) Applicant: Fujitsu Limited, Kawasaki (JP)

(72) Inventor: Ryosuke Kito, Akiruno (JP)

(73) Assignee: Fujitsu Limited, Kawasaki (JP)

( * ) Notice: Subject to any disclaimer, the term of this patent is extended or adjusted under 35 U.S.C. 154(b) by 34 days.

(21) Appl. No.: 13/719,292

(22) Filed: Dec. 19, 2012

(65) Prior Publication Data

US 2013/0205048 A1    Aug. 8, 2013

(30) Foreign Application Priority Data

Feb. 7, 2012    (JP) ................................. 2012-024478

(51) Int. Cl.
    *G06F 3/00*           (2006.01)
    *G06F 13/40*         (2006.01)
    *G06F 13/12*         (2006.01)
    *G06F 13/38*         (2006.01)

(52) U.S. Cl.
    CPC ............ *G06F 13/12* (2013.01); *G06F 13/4009* (2013.01); *G06F 13/385* (2013.01)
    USPC ........................................................... 710/5

(58) Field of Classification Search
    CPC .................................................... G06F 13/161
    USPC ........................................................... 710/5
    See application file for complete search history.

(56) References Cited

U.S. PATENT DOCUMENTS

| | | | |
|---|---|---|---|
| 2003/0093632 A1* | 5/2003 | Osborne | ....................... 711/154 |
| 2006/0041706 A1 | 2/2006 | Su et al. | |
| 2008/0144826 A1 | 6/2008 | Chang | |
| 2008/0162769 A1 | 7/2008 | Wojciechowski | |

FOREIGN PATENT DOCUMENTS

JP         2002-169768 A       6/2002

OTHER PUBLICATIONS

Extended European Search Report dated Jul. 10, 2014 for European Patent Application No. 13151281.6, 4 pages.

* cited by examiner

*Primary Examiner* — Chun-Kuan Lee
(74) *Attorney, Agent, or Firm* — Fujitsu Patent Center

(57) ABSTRACT

An information processing apparatus includes a processing unit configured to issue a read command to a device, a memory configured to store data, and a switching controller configured to connect the processing unit, the memory, and the device. The switching controller includes a command detection circuit configured to detect the read command issued from the processing unit, a command processing circuit configured to process the read command and to output the processed read command, and a pre-read request issuance circuit configured to generate a read request for at least part of data within data specified by the read command and to transmit the read request to the memory. The switching controller receives the part of the data from the memory, and transmits the part of the data to the device.

10 Claims, 22 Drawing Sheets

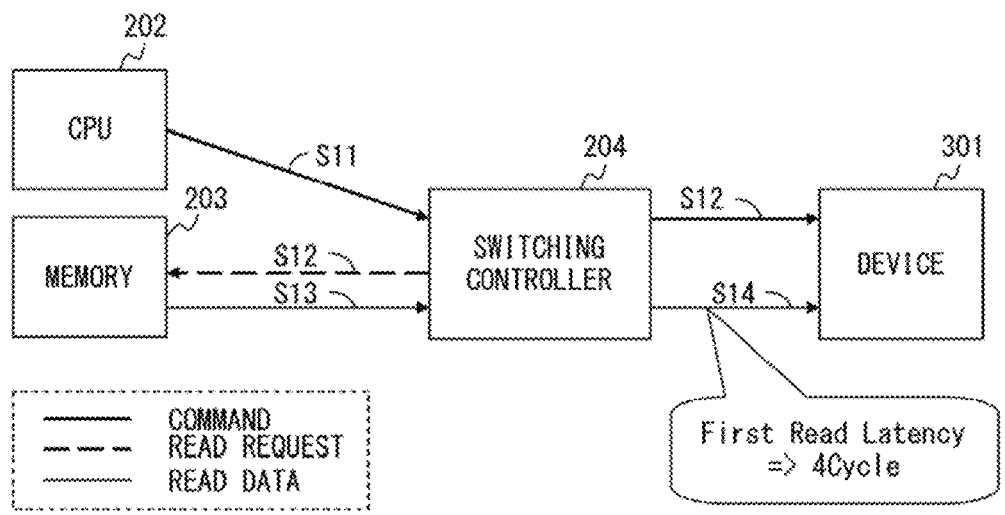
F I G. 5

| OPC | AD | LE | R |

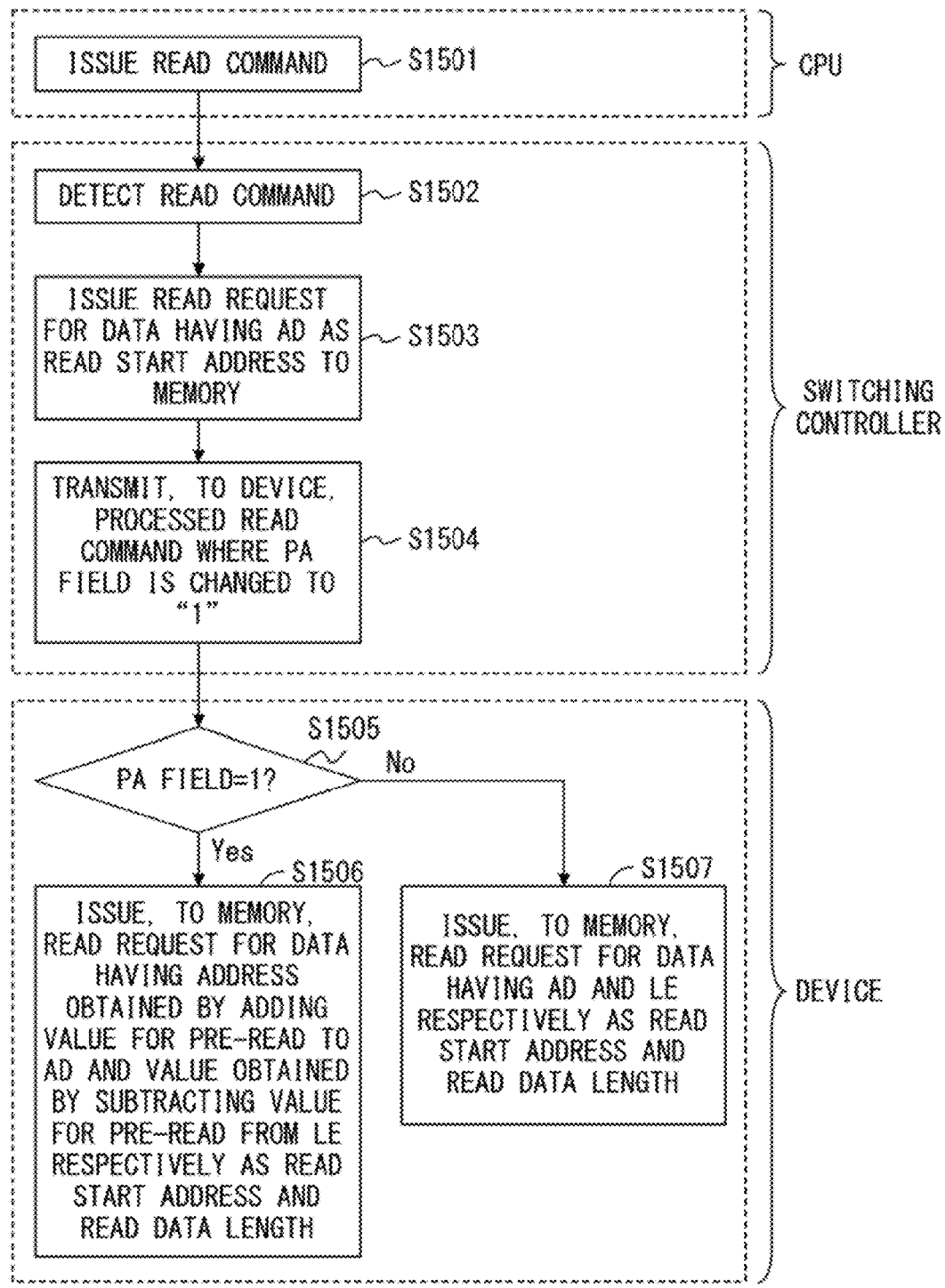
F I G. 10

F I G. 1 1  RELATED ART

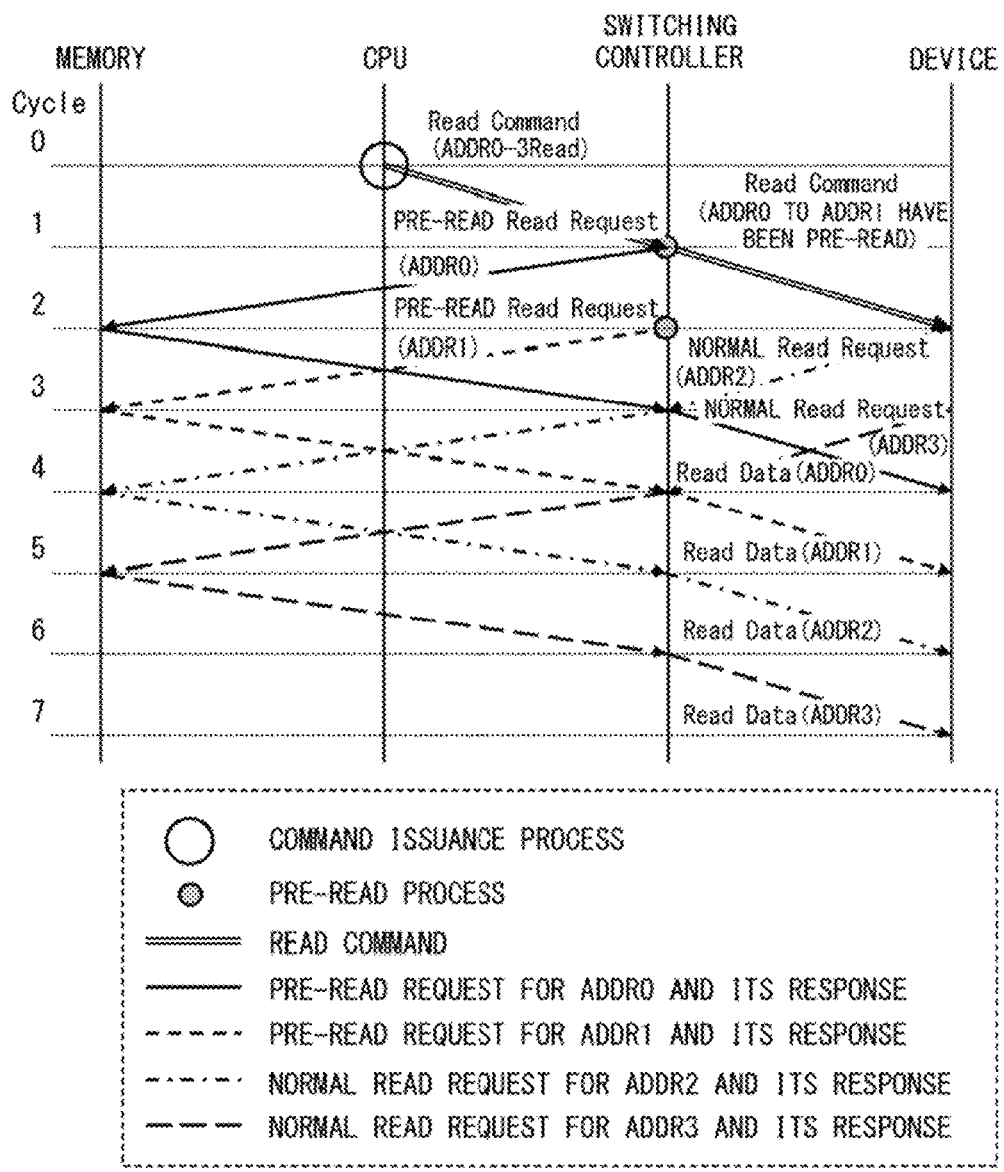
F I G. 12

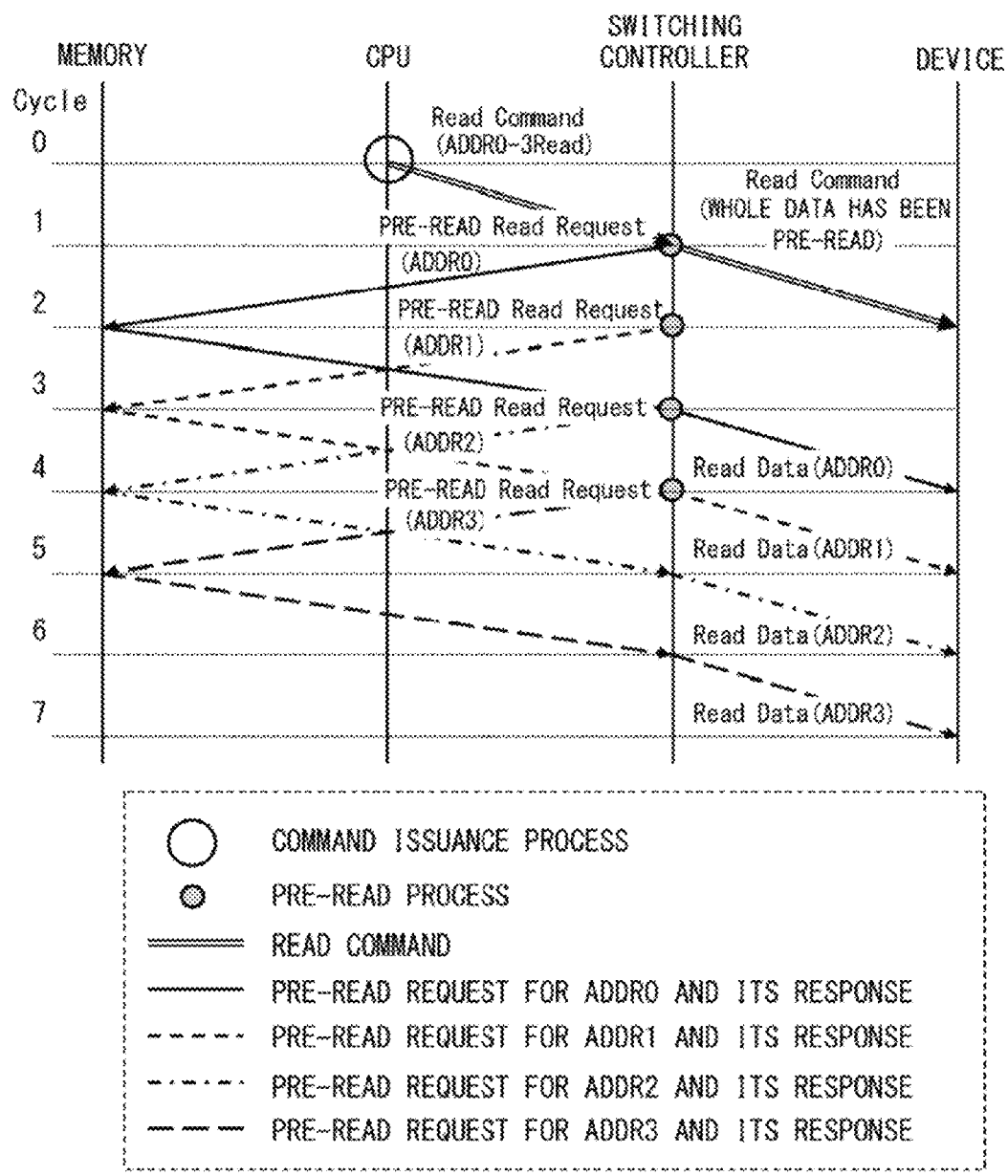
F I G. 13

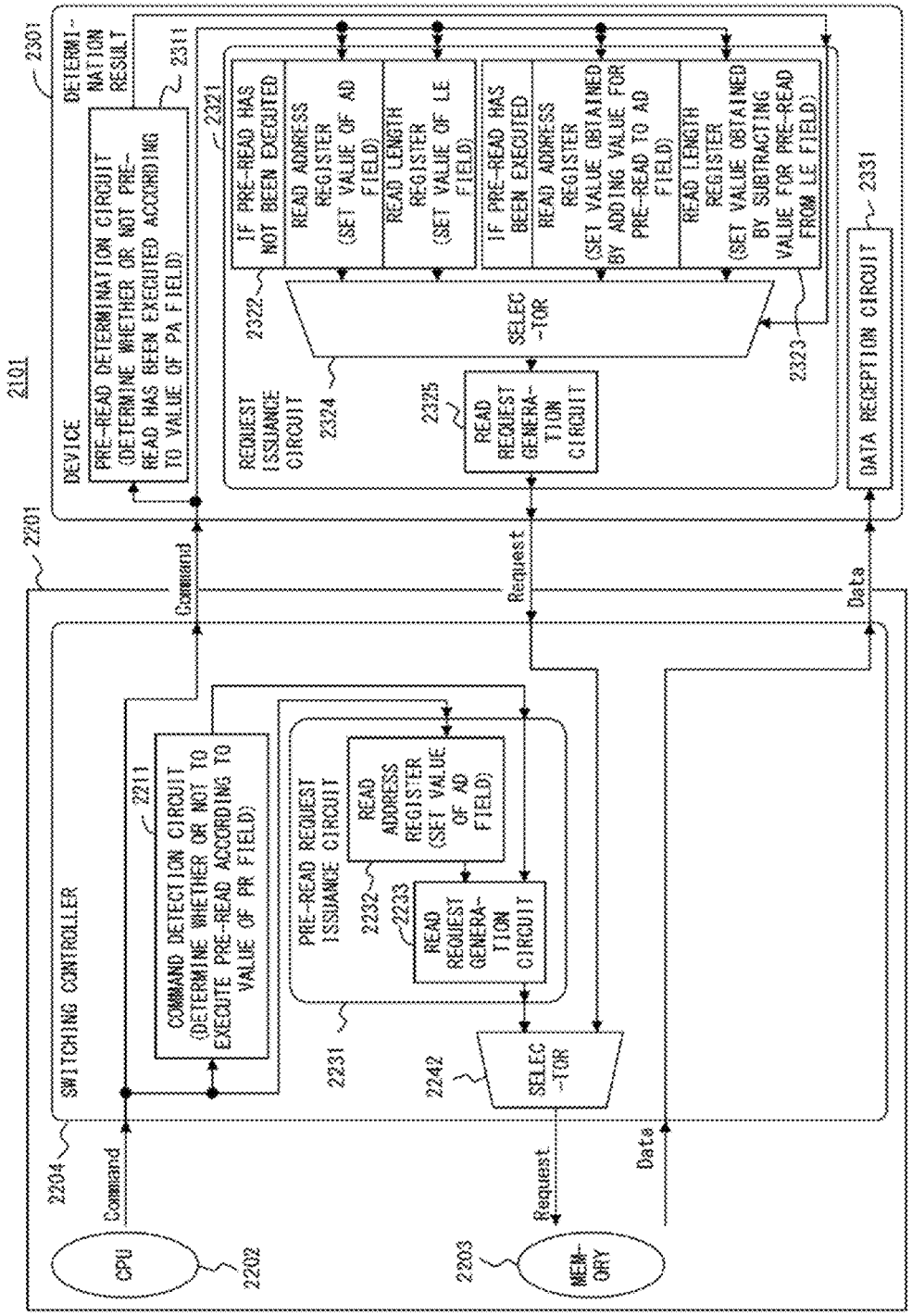
F I G. 14

| OPC | AD | LE | PR |
|---|---|---|---|

2251

F I G. 15

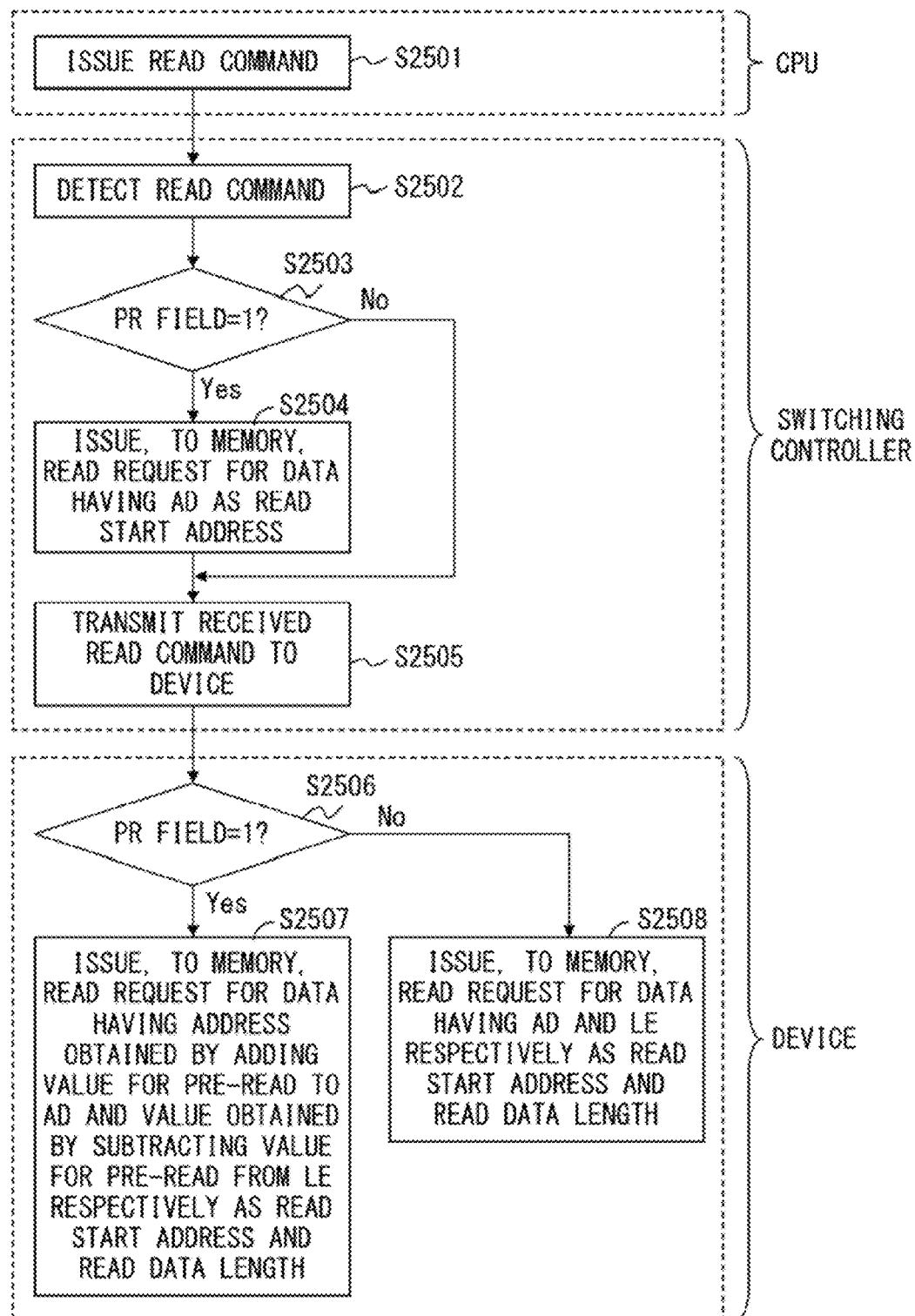
F I G. 16

| OPC | AD | LE | PR | PL | PA |

3251

F I G. 18

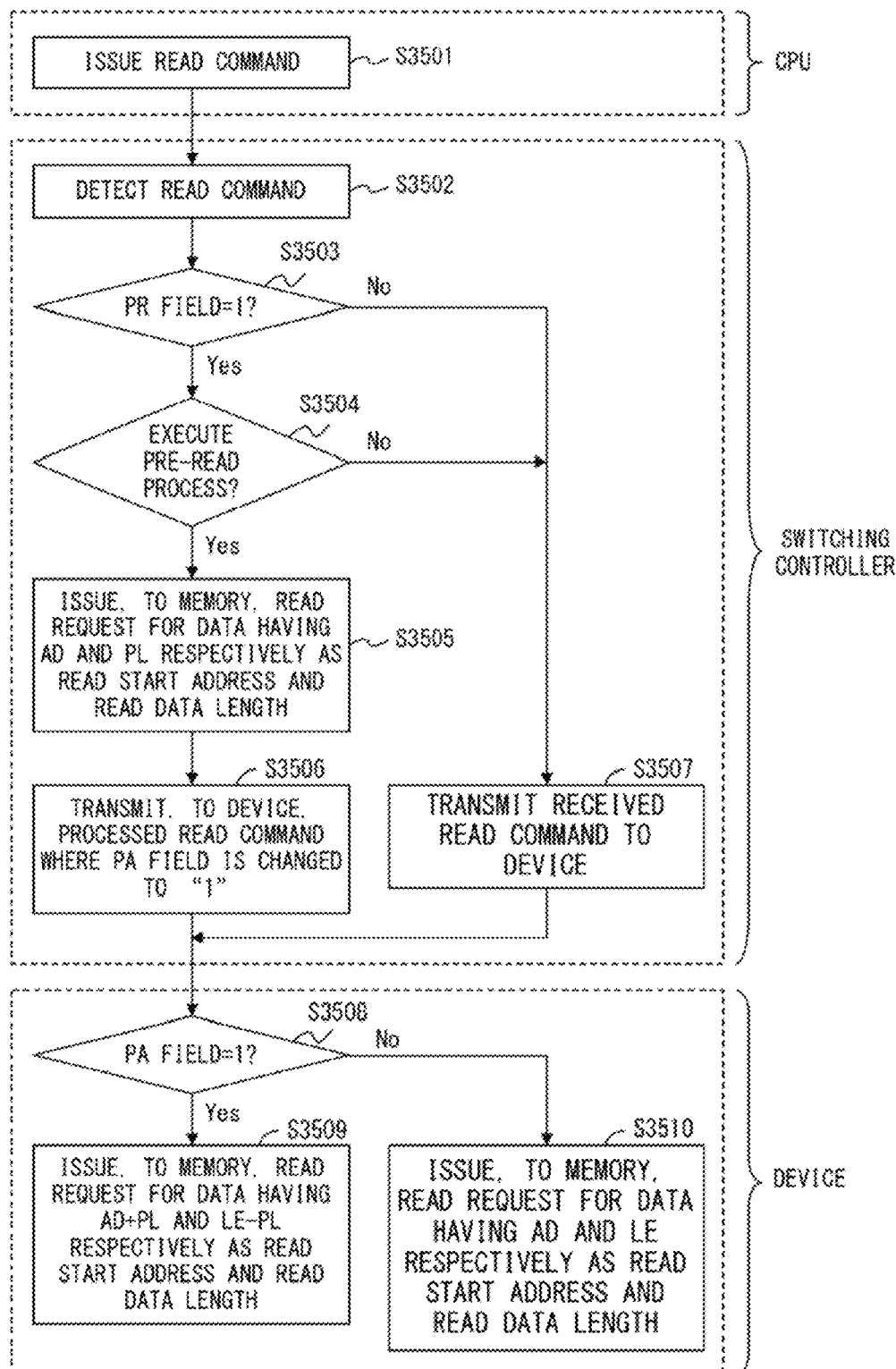
F I G. 19

INFORMATION PROCESSING APPARATUS AND CONTROL METHOD THEREOF

CROSS-REFERENCE TO RELATED APPLICATION

This application is based upon and claims the benefit of priority of the prior Japanese Patent Application No. 2012-024478, filed on Feb. 7, 2012, the entire contents of which are incorporated herein by reference.

FIELD

The embodiments discussed herein are related to an information processing apparatus, and a control method thereof.

BACKGROUND

FIG. 1 illustrates a flow of a conventional read process.

FIG. 2 is a sequence diagram illustrating the conventional read process.

A conventional system 11 includes a central processing unit (CPU) 12, a memory 14, a switching controller 13, and a device 15.

The CPU 12, the memory 14, and the device 15 are connected to the switching controller 13.

Here, a flow of a process executed from when the CPU 12 issues a read command (process requests by which the device reads data from the memory) from an address (ADDR) 0 to an address 2 until when the device 15 receives initial read data is described. Each time the process is executed by one step, cycles proceed by 1.

The CPU 12 issues the read command for the address 0 to the address 2 to the device 15 (step S1), and the switching controller 13 relays the read command to the device 15 (step S2).

The device 15 issues a read request for the address 0 to the memory 14 (step S3), and the switching controller 13 relays the read request to the memory 14 (step S4). A description of data read from the addresses 1 and 2 is omitted.

The memory 14 returns data of the address 0 to the device 15 as read data (step S5), and the read data is transferred to the switching controller 13.

The switching controller 13 relays the read data to the device 15 (step S6), which then receives the read data.

As illustrated in FIG. 2, when the read command is issued in a cycle 0, the read data of the address 0 reaches the device 15 in a cycle 6.

Namely, with the conventional read process, the number of cycles (First Read Latency) from when the CPU 12 issues the read command until when the device 15 receives the initial read data is 6.

With the conventional read process, the read command, the read request, or the read data passes through 6 paths from when the CPU issues the read command until when the device receives the read data, so that a latency is increased.

Especially, an interface (I/F) serialized to secure a high band has a very high latency in a serial/parallel conversion unit. Therefore, the high latency is noticeably exhibited as performance degradation if a command or data passes through many paths, leading to a problem.

Patent Document 1) Japanese Laid-Open Patent Publication No. 2002-169768

SUMMARY

According to an aspect of the invention, an information processing apparatus includes a processing unit configured to issue a read command to a device, a memory configured to store data, and a switching controller configured to connect the processing unit, the memory, and the device.

The switching controller includes a command detection circuit, a command processing circuit, a selector, and a pre-read request issuance circuit.

The command detection circuit detects the read command issued from the processing unit.

The command processing circuit processes the read command, and outputs the read command processed by the device.

The pre-read request issuance circuit generates a read request for at least part of data within data specified by the read command, and transmits the read request to the memory.

The switching controller receives the part of the data from the memory, and transmits the part of the data to the device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a flow of the read process according to the first embodiment.

FIG. 8 illustrates a format of a read command according to the second embodiment.

FIG. 10 is a flowchart illustrating a read process according to the second embodiment.

FIG. 12 is a sequence diagram illustrating a read process (pre-read of part of data) according to the second embodiment.

FIG. 13 is a sequence diagram illustrating a read process (pre-read of whole data) according to the second embodiment.

FIG. 14 is a block diagram illustrating a configuration of a system according to a third embodiment.

FIG. 15 illustrates a format of a read command according to the third embodiment.

FIG. 16 is a flowchart illustrating the read process according to the third embodiment.

FIG. 18 illustrates a format of a read command according to the fourth embodiment.

FIG. 19 is a flowchart illustrating a read process according to the fourth embodiment.

DESCRIPTION OF EMBODIMENTS

Figure 3:
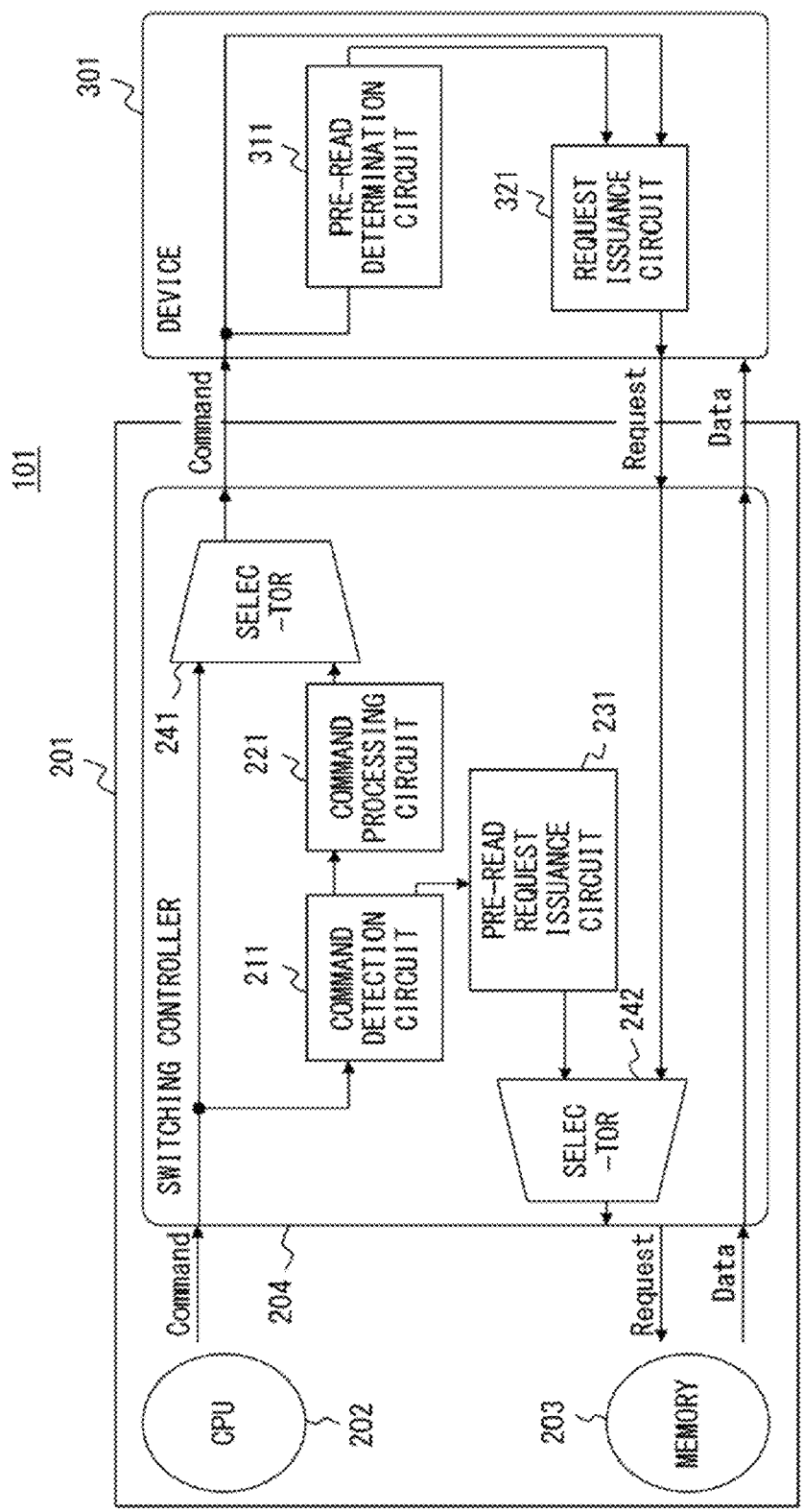
FIG. 3 is a block diagram illustrating a configuration of a system according to a first embodiment.

Embodiments according to the present invention are described in detail below with reference to the drawings.
First Embodiment FIG. 3 is a block diagram illustrating a configuration of a system according to a first embodiment.

The system 101 includes a personal computer (PC) 201, and a device 301.

The PC 201 and the device 301 are connected, for example, by a aerial interface.

The PC 201 is one example of an information processing apparatus.

The PC 201 includes a central processing unit (CPU) 202, a memory 203, and a switching controller 204.

The CPU 202 is a processor for executing various types of processes. The CPU 202 issues a command such as a read command that is a process request by which the device 301 reads data from the memory 203.

The memory 203 is a storage device for temporarily storing data. The memory 203 is, for example, a RAM (Random Access Memory). The memory 203 transmits data specified by a read request to the switching controller 204 upon receipt of the read request.

The switching controller 204 is a circuit for interconnecting the CPU 202, the memory 203, and the device 301, and for controlling routing.

The switching controller 204 includes a command detection circuit 211, a command processing circuit 221, a pre-read request issuance circuit 231, and selectors 241, 242.

The command detection circuit 211 checks a command received from the CPU 202, and detects a read command. If the command detection circuit 211 detects the read command, it outputs the read command to the command processing circuit 221, and the pre-read request issuance circuit 231.

The command processing circuit 221 processes the read command, and outputs the processed read command to the selector 241.

The pre-read request issuance circuit 231 outputs a read request for (read) at least part of data specified by the read command.

The selector 241 outputs the command received from the CPU 201 or the processed read command output from the command processing circuit 221 to the device 301.

The selector 242 outputs the read request received from the pre-read request issuance circuit 231 or the device 301 to the memory 203.

The device 301 receives the command from the PC 201, and transmits the read request to the PC 201 or receives data from the PC 201.

The device 301 is a device for storing data. The device 301 is, for example, a magnetic disk device (hard disk drive), a semiconductor storage device or the like.

The device 301 includes a pre-read determination circuit 311, and a request issuance circuit 321.

The pre-read determination circuit 311 checks a received read command, determines whether or not the PC 201 has executed a pre-read process, and. outputs a determination result to the request issuance circuit 321. The pre-read process is a process for reading at least part of the data specified by the read command.

The request issuance circuit 321 receives the read command, generates a read request according to the determination result of the pre-read determination circuit 311, and outputs the read request to the selector 242.

Figure 4:
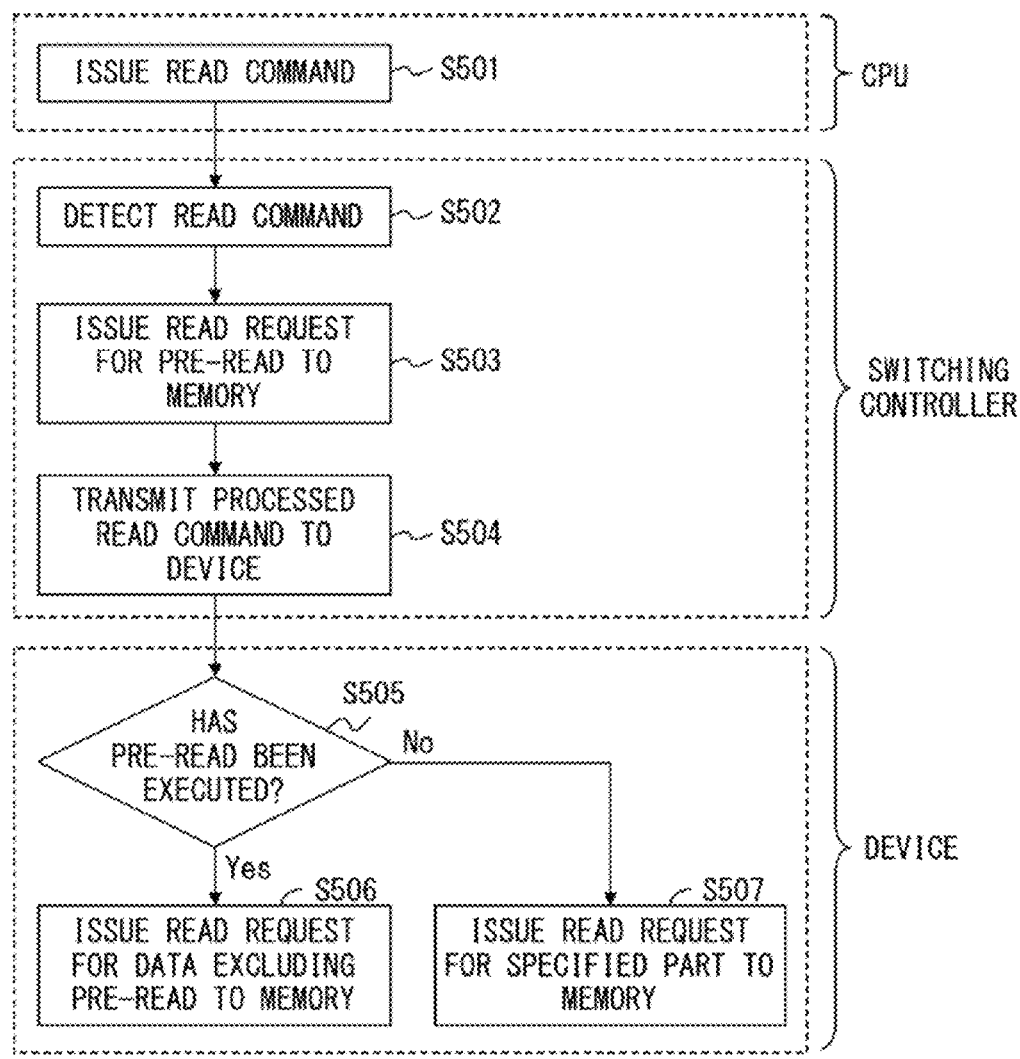
FIG. 4 is a flowchart illustrating a read process according to the first embodiment.

FIG. 4 is a flowchart illustrating the read process according to the first embodiment.

In step S501, the CPU 202 issues a command. Here, assume that the CPU 202 issues a read command as the command.

In step S502, the command detection circuit 211 checks the received command, and detects that the received command is a read command. The command detection circuit 211 outputs the received read command to the command processing circuit 221, and the pre-read request issuance circuit 231.

In step S503, the pre-read request issuance circuit 231 outputs, to the selector 242, a pre-read request for data for a pre-read within the data specified by the read command. The selector 242 outputs the received pre-read request to the memory 203. The memory 203 outputs the data for the pre-read requested by the pre-read request to the switching controller 204 as read data, and the switching controller 204 outputs the received read data to the device 301. Assume that a size of the pre-read data is preset.

In step S504, the command processing circuit 221 processes the read command, and outputs the processed read command to the selector 241. Information indicating that the pre-read process has been executed is added to the processed read command. The selector 241 outputs the processed read command to the device 301.

In step S505, the pre-read determination circuit 311 checks the received read command, determines whether or not the pre-read process has been executed, and outputs a determination result to the request issuance circuit 321. If the pre-read process has been executed, a control proceeds to step S506. If the pre-read process has not been executed, the control proceeds to step S507.

In step S506, the request issuance circuit 321 generates a read request for data excluding the data for the pre-read within the data specified by the read command to the memory 203, and outputs the read request to the selector 242.

In step S507, the request issuance circuit 321 generates a read request for the data specified by the read command to the memory 203, and outputs the read request to the selector 242.

After step S506 or S507, the selector 242 outputs the received read request to the memory 203. Then, the switching controller 204 receives the read data requested by the read request from the memory 203, and transfers the received data to the device 301.

FIG. 5 illustrates the flow of the read process according to the first embodiment.

Figure 6:
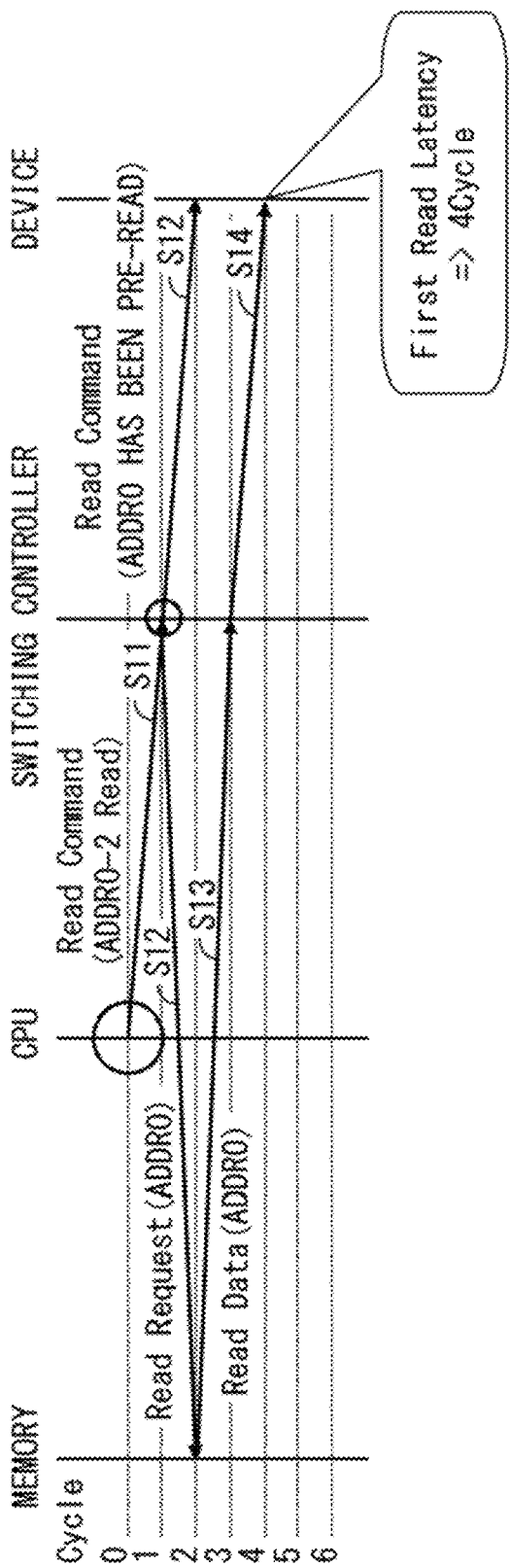
FIG. 6 is a sequence diagram illustrating the read process according to the first embodiment.

FIG. 6 is a sequence diagram illustrating the read process according to the first embodiment.

Here, the flow of the process executed from when the CPU 202 issues a read command for reading data from an address (ADDR) 0 to an address 2 in a cycle 0 until when the device 301 receives the read data of the address 0 is described. Each time the process is executed by 1 step, cycles proceed by 1. Moreover, a description of data reads from the addresses 1 and 2 is omitted.

The CPU 202 issues the read command from the address 0 to the address 2 to the device 301 (step S11), and the read command reaches the switching controller 204.

The switching controller 204 detects the read command, generates a read request for a pre-read, and performs processing for adding information indicating that a pre-read process has been executed to the read command. Here, assume that the address 0 is set for the pre-read. Then, the switching controller 204 outputs the read request for the address 0 to the memory 203, and further outputs the processed read command to the device 301 (step S12).

The memory 203 outputs the data of the address 0 to the switching controller 204 as read data (step S13).

The switching controller 204 relays the read data to the device 301 (step S14), which then receives the read data.

As illustrated in FIG. 6, when the read command is issued in a cycle 0, the read data reaches the device 301 in a cycle 4.

Namely, in the read process according to the first embodiment, the number of cycles (First Read Latency) needed from when the CPU 202 issues the read command until when the device 301 receives the initial read data is 4.

Figure 1:
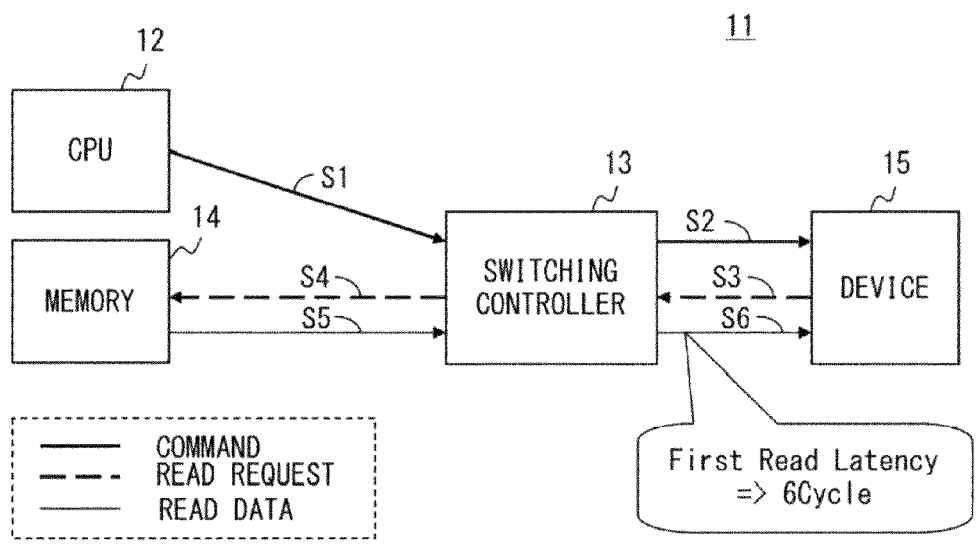
FIG. 1 illustrates a flow of a conventional read process.
Figure 2:
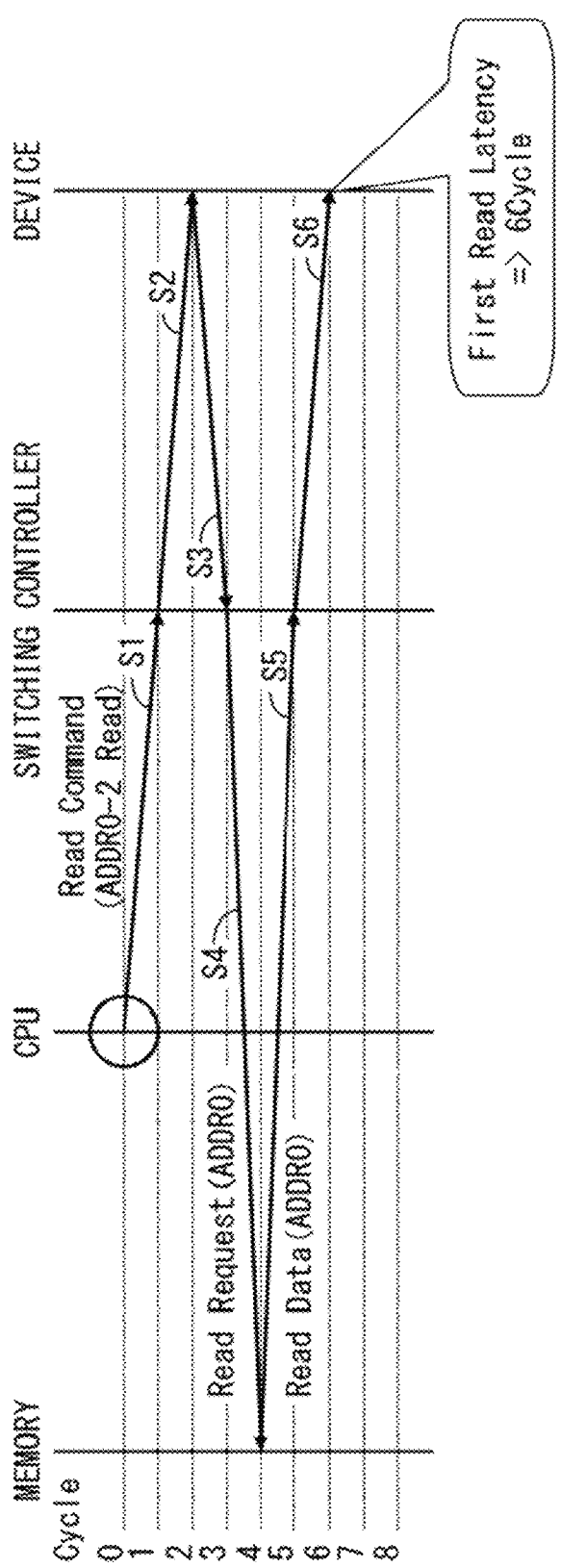
FIG. 2 is a sequence diagram illustrating the conventional read process.

Comparing with the conventional read process illustrated in FIG. 2, the number of cycles needed from when the CPU issues the read command until when the initial read data is received is reduced by 2 cycles in the read process according to the first embodiment.

Namely, with the system according to the first embodiment, the latency in the read process can be reduced.

(Second Embodiment)

Figure 7:
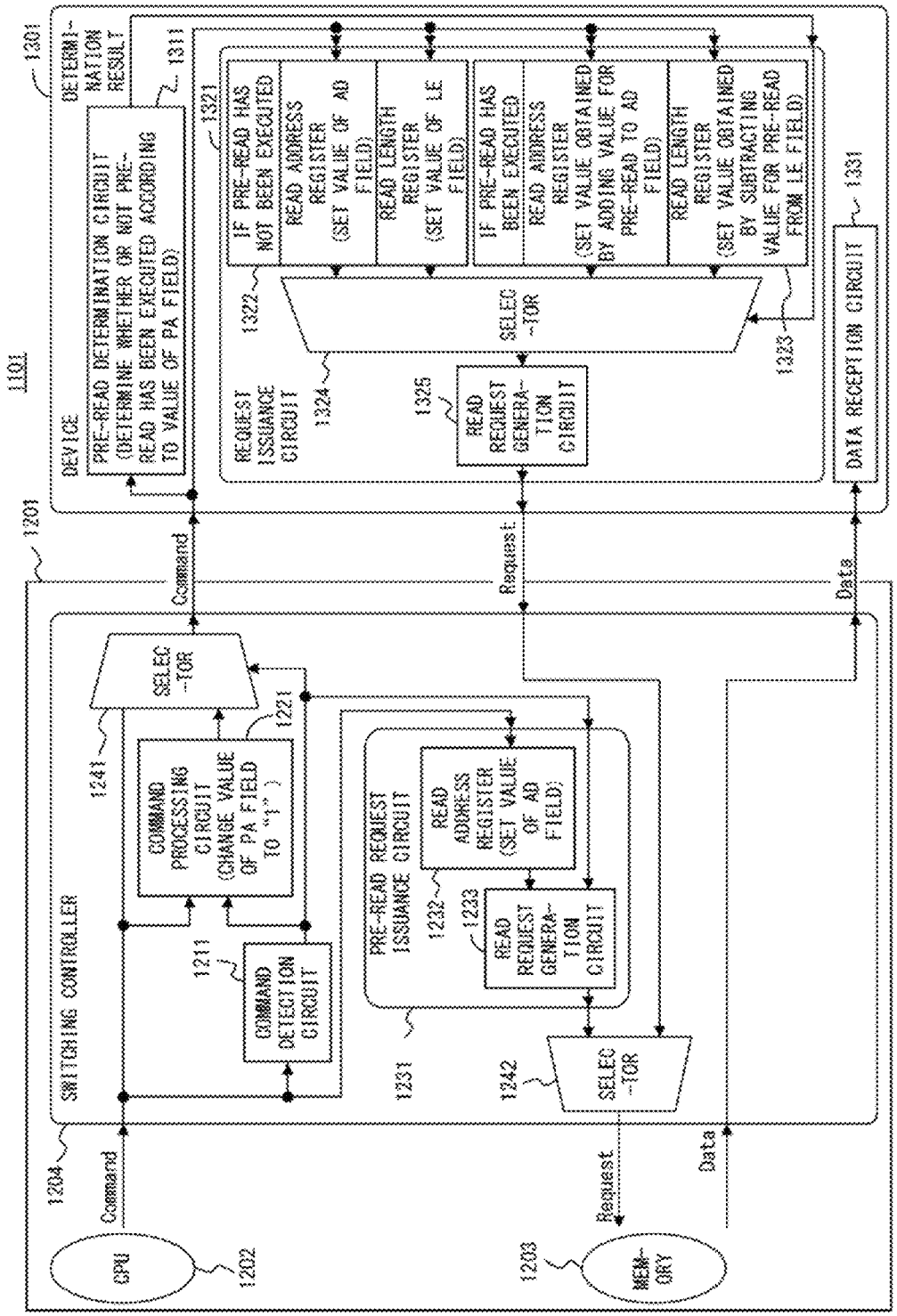
FIG. 7 is a block diagram illustrating a configuration of a system according to a second embodiment.

FIG. 7 is a block, diagram illustrating a configuration of a system according to a second embodiment.

The system 1101 includes a PC 1201, and a device 1301.

The PC 1201 and the device 1301 are connected, for example, by a serial interface.

The PC 1201 is one example of an information processing apparatus.

The PC 1201 includes a CPU 1202, a memory 1203, and a switching controller 1204.

Since the CPU 1202 and the memory 1203 have functions similar to the CPU 202 and the memory 203 in the first embodiment, their descriptions are omitted.

The switching controller 1204 is a circuit for interconnecting the CPU 1202, the memory 1203, and the device 1301, and for controlling routing.

The switching controller 1204 includes a command detection circuit 1211, a command processing circuit 1221, a pre-read request issuance circuit 1231, and selectors 1241, 1242.

The command detection circuit 1211 checks a command received from the CPU 1202, and detects a read command. If the command detection circuit 1211 detects the read command, it outputs a detection signal indicating that the read command has been detected to the command processing circuit 1221, the pre-read request issuance circuit 1231, and the selector 1241.

The command processing circuit 1221 processes the read command according to the detection signal from the command detection circuit 1211, and outputs the processed read command to the selector 1241.

Here, formats of the read command and the processed read command are described.

Figure 8:
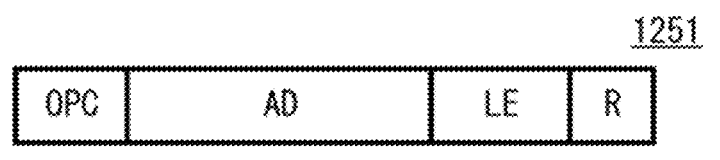

FIG. 8 illustrates the format of the read command according to the second embodiment.

The read command 1251 includes an opcode (OPC), an address (AD), a length (LE), and reserved (R).

The "opcode" indicates a type of a command. For example, if a command is a read command, information indicating the read command is written as the "opcode".

The "address" indicates a read start address.

The "length" indicates a length of read data.

The "reserved" indicates an unused empty field.

Additionally, fields where OPC, AD, and LE are written are called an OPC field, an AD field, and an LE field, respectively.

Figure 9:
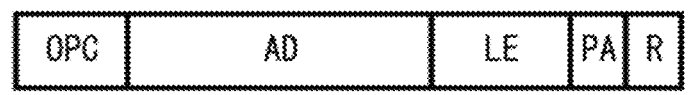
FIG. 9 illustrates a format of a processed read command according to the second embodiment.

FIG. 9 illustrates the format of the processed read command according to the second embodiment.

The processed read command 1252 includes an opcode (OPC), an address (AD), a length (LE), Pre read Act (PA), and reserved (R).

Since the "opcode", the "address", the "length", and the "reserved" are similar to those of the above described read command, their descriptions are omitted.

"Pre read Act" is a flag indicating whether or not a pre-read process has been executed. Fox example, if "1" is written to "Pre read Act", this indicates that the pre-read process has been executed.

Additionally, a field where PA is written is called a PA field.

If the command processing circuit 1221 receives the detection signal from the command detection circuit 1211, it appends the PA field to the length field of the read command 1251, and writes "1" to the PA field. The read command where "1" written to the PA field results in the processed read command 1252.

Then, the command processing circuit 1221 outputs the processed read command 1252 to the selector 1241.

The pre-read request issuance circuit 1231 outputs a read request for at least part of data specified by the read command.

The pre-read request issuance circuit 1231 includes a read address register 1232, and a read request generation circuit 1233.

The read address register 1232 stores a value of the AD field of the read command 1251.

The read request generation circuit 1233 generates a read request for data for a pre-read starting at the value stored in the read address register 1232, and outputs the read request to the selector 1242. Assume that the length of the data for the pre-read is preset.

The selector 1241 outputs either of the command received from the CPU 1201 or the processed read command received from the command processing circuit 1222 to device 1301 according to the detection signal from the command detection circuit 1211.

The selector 1242 outputs the read request received from the pre-read request issuance circuit 1231 or the device 1301 to the memory 1203.

The device 1301 receives the command from the PC 1201, and transmits the request to the PC 1201 or receives data from the PC 1201.

The device 1301 is a device for storing data, and is, for example, a magnetic: disk device (hard disk drive), a semiconductor storage device or the like.

The device 1301 includes a pre-read determination circuit 1311, a request issuance circuit 1321, and a data reception circuit 1331.

The pre-read determination circuit 1311 checks a received read command, determines whether or not a pre-read process has been executed, and outputs a determination result to the request issuance circuit 1321. Whether or not the pre-read process has been executed is determined based on a value of the FA field of the received read command. For example, if "1" is written to the PA field of the received read command, the pre-read determination circuit 1311 determines that the pre-read process has been executed. If the received read command does not include the PA field, the pre-read determination circuit 1311 determines that that pre-read process has not been executed.

The request issuance circuit 1321 receives the read command, generates a read request according to the determination result of the pre-read determination circuit 1311, and outputs the read request to the selector 1242.

The request issuance circuit 1321 includes a first register 1322, a second register 1323, a selector 1324, and a read request generation circuit 1325.

The first register 1322 includes a read address register, and a read length register.

The read address register of the first register 1322 stores the value of the AD field of the received read command.

The read length register of the first register 1322 stores the value of the LE field of the received read command.

The second register 1323 includes a read address register, and a read length register.

The read address register of the second register 1323 stores a value obtained by adding the length of data for a pre-read to the value of the AD field of the received read command.

The read length register of the second register 1323 stores a value obtained by subtracting the length of the data for the pre-read from the value of the LE field of the received read command.

Note that the length of the data for the pre-read is preset. Moreover, the set length of the data for the pre-read has the same value in the switching controller 1204 and the device 1301.

The selector 1324 outputs the data stored either in the first register 1322 or in the second register 1323 to the read request generation circuit 1325 according to the determination result of the pre-read determination circuit 1311.

Specifically, if the determination result indicates that the pre-read process has been executed, the selector 1324 outputs the data stored in the second register 1323 to the read request generation circuit 1325. If the determination result indicates that the pre-read process has not been executed, the selector 1324 outputs the data stored in the first register 1322 to the read request generation circuit 1325.

The read request generation circuit 1325 generates a read request based on the output of the selector 1324.

The data reception circuit 1331 receives the read data from the switching controller 1204.

FIG. 10 is a flowchart illustrating the read process according to the second embodiment.

In step S1501, the CPU 1202 issues a command. Here, assume that the CPU 1202 issues a read command as the command.

In step S1502, the command detection circuit 1211 checks the received command, and detects that the received command is a read command. The command detection circuit 1211 outputs a detection signal indicating that the read command has been detected to the command processing circuit 1221, the pre-read request issuance circuit 1231, and the selector 1241.

In step S1503, the pre-read request issuance circuit 1231 reads the value (AD) of the AD field of the read command, and stores the read value in the read address register 1232. If the read request generation circuit 1233 receives the detection signal, it reads the value stored in the read address register 1232, recognizes the read value as a read start address, generates a read request for data for a pre-read starting at the read start address, and outputs the read request to the selector 1242. The selector 1242 outputs the received read request to the memory 1203. The switching controller 1204 receives read data corresponding to the read request for the pre-read, and transfers the received data to the data reception circuit 1331.

In step S1504, the command processing circuit 1221 processes the read command if it receives the detection signal. Specifically, the command processing circuit 1221 adds a PA field to the read command, and writes "1" to the PA field. Then, the command processing circuit 1221 outputs the processed read command to the selector 1241. The selector 1241 outputs the processed read command to the device 1302 if it receives the detection signal.

In step S1505, the pre-read determination circuit 1312 determines whether or not the pre-read process has been executed based on the value of the PA field of the received read command, and outputs a determination result to the request issuance circuit 1321. If the value of the PA field of the read command is "1", the pre-read determination circuit 1311 determines that the pre-read process has been executed. If the value of the PA field is not "1", the pre-read determination circuit 1311 determines that the pre-read process has not been executed.

If "1" is written to the PA field (namely, if the pre-read process has been executed), a control proceeds to step S1506. If "1" is not written to the PA field (namely, the pre-read process has not been executed), the control proceeds to step S1507.

In step S1506, the request issuance circuit 1321 stores the value (AD) of the AD field and the value (LE) of the LE field of the received read command respectively in the read address register and the read length register of the first register 1322.

The request issuance circuit 1321 stores a value obtained by adding the length of the data for the pre-read to the value (AD) of the AD field and a value obtained by subtracting the length of the data for the pre-read from the value (LE) of the LE field of the received read command respectively in the read address register and the read length register of the second register 1323.

The selector 1324 outputs the data stored in the read address register and the read length register of the second register 1323, namely, the value obtained by adding the length of the data for the pre-read to AD and the value obtained by subtracting the length of the data for the pre-read from LE to the read request generation circuit 1325.

The read request generation circuit 1325 generates a read request for data having the value obtained by adding the length of the data for the pre-read to AD and the value obtained by subtracting the length of the data for the pre-read from LE respectively as a read start address and a read data length, and outputs the read request to the selector 1242.

If the value obtained by subtracting the length of the data for the pre-read from LE is "0", the read request generation circuit 1325 does not generate a read request.

In step S1507, the request issuance circuit 1321 stores the value (AD) of the AD field and the value (LE) of the LE field of the received read command respectively in the read address register and the read length register of the first register 1322.

The request issuance circuit 1321 stores the value obtained by adding the length of the data for the pre-read to the value (AD) of the AD field and the value obtained by subtracting the length of the data for the pre-read from the value (LE) of the LE field of the received read command respectively in the read address register and the read length register of the second register 1323.

The selector 1324 outputs the data stored in the read address register and the read length register of the first register 1322, namely, AD and LE to the read request generation circuit 1325.

The read request generation circuit 1325 generates a read request for data having AD and LE respectively as a read start address and a read data length, and outputs the read request to the selector 1242.

After step S1506 or S1507, the selector 1242 outputs the received read request to the memory 1203, Then, the switching controller 1204 receives the read data requested by the read request from the memory 1203, and transfers the data to the data reception circuit 1331.

Here, a sequence diagram in a case where the conventional read process is executed, and that in a case where the read process according to the second embodiment is executed are described to depict an effect of the read process according to the second embodiment.

The following sequence diagrams assume that a read command where ADDR0 and 4 are respectively written to the AD field and the LE field is issued from the CPU. Namely, a process for reading data from ADDR0 to ADDR3 is described.

Additionally, assume that each read request by 1 length is generated in the read process.

Figure 11:
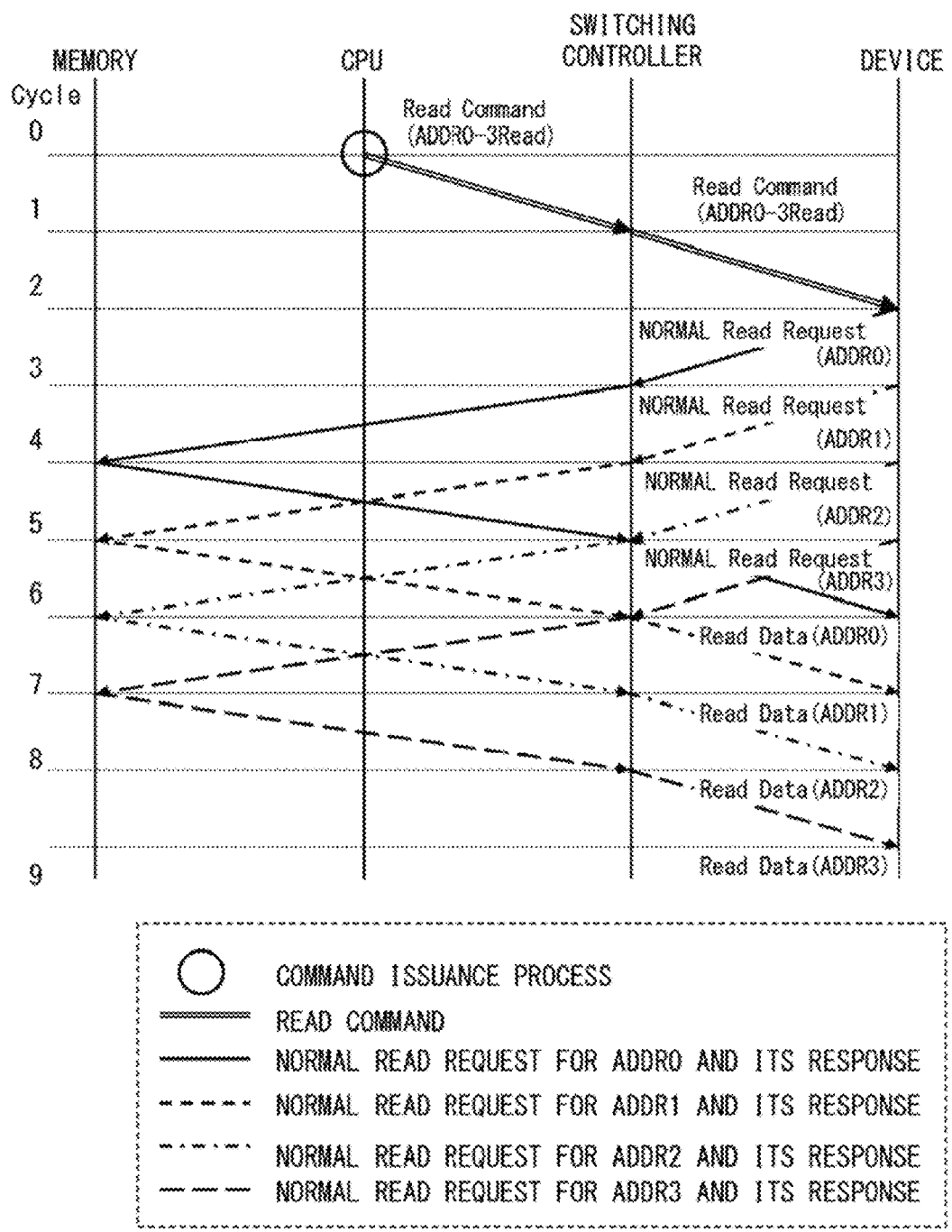
FIG. 11 is a sequence diagram illustrating the conventional read process.

FIG. 11 is the sequence diagram illustrating the conventional read process.

A read command is initially issued from the CPU (cycle 0), relayed by the switching controller (cycle 1), and reaches the device (cycle 2).

In cycles 2 to 5, requests respectively for ADDR0 to ADDR3 are issued from the device.

The read requests for ADDR0 to ADDR3 are relayed by the switching controller (cycles 3 to 6), and respectively reach the memory (cycles 4 to 7).

In the cycles 4 to 7, data of ADDR0 to ADDR3 are respectively transmitted from the memory.

The data of ADDR0 to the ADDR3 are relayed by the switching controller (cycles 5 to 8), and respectively reach the memory (cycles 6 to 9).

The conventional read process needs 6 cycles until when the device receives the initial data (namely, the data of ADDR0), and needs 9 cycles until when the device receives all the pieces of data.

FIG. 12 is the sequence diagram of the read process (pre-read of part of data) according to the second embodiment.

In FIG. 12, assume that data by 2 lengths (ADDR0 and ADDR1) are read with the pre-read process.

A read command is initially issued from the CPU (cycle 0), relayed by the switching controller (cycle 1), and reaches the device (cycle 2).

In cycles 1 to 2, read requests (pre-read requests) respectively for ADDR0 to ADDR1 are issued from the switching controller.

In cycles 2 to 3, read requests respectively for ADDR2 to ADDR3 are issued from the device.

The read requests for ADDR2 to ADDR3 are relayed by the switching controller (cycles 3 to 4), and respectively reach the memory (cycles 4 to 5).

In cycles 2 to 5, date of ADDR0 to ADDR3 are respectively transmitted from the memory.

The data of ADDR0 to ADDR3 are relayed by the switching controller (cycles 3 to 6), and respectively reach the memory (cycles 4 to 7).

The read process for pre-reading part of data according to the second embodiment needs 4 cycles until when the device receives the initial data (namely, the data of ADDR0), and needs 7 cycles until when the device receives all the pieces of data.

Namely, with the read process for pre-reading part of the data according to the second embodiment, a latency can be reduced in comparison with the conventional read process.

FIG. 13 is a sequence diagram illustrating the read process (pre-read for all the pieces of data) according to the second embodiment.

In FIG. 13, assume that all the pieces of data (ADDR0 to ADDR3) are pre-read with a pre-read process.

A read command is initially issued from the CPU (cycle 0), and reaches the switching controller (cycle 1).

Information indicating that the pre-read process has been executed is added to the read command, which is then transmitted to the device (cycle 1).

In the cycles 1 to 4, read requests (pre-read requests) to request ADDR0 to ADDR3 are respectively issued from the switching controller.

In the cycles 2 to 5, data of ADDR0 to ADDR3 are respectively transmitted from the memory.

The data of ADDR0 to ADDR3 are relayed by the switching cent roll ex (cycles 3 to 6), and respectively reach the memory (cycles 4 to 7).

The read process for pre-reading ail the pieces of data according to the second embodiment needs 4 cycles until when the device receives the initial data (namely, the data of ADDR0), and needs 7 cycles until when the device receives all the pieces of data.

Namely, with the read process fox pre-reading ail the pieces of data according to the second embodiment, the latency can be reduced in comparison with the conventional read process.

Additionally, 7 cycles are needed until when the device receives all the pieces of data in both the case of pre-reading all the pieces of data illustrated in FIG. 13 and the case of pre-reading part of data illustrated in FIG. 12, and there is no difference in the cycles needed until when the device receives all the pieces of data.

However, the case of pre-reading part of data offers an advantage that resources such as a circuit for controlling the number of reads can be reduced.

As described above, with the read process according to the second embodiment, the latency can be reduced in comparison with the conventional read process.

(Third Embodiment)

In the second embodiment, the pre-read process is executed in ail cases if a command is a read command. In contrast, a third embodiment refers to a case where execution of a pre-read process is controlled by adding a flag indicating whether or not to execute a pre-read process to a read command issued from the CPU.

FIG. 14 is a block diagram illustrating a configuration of a system according to the third embodiment.

The system 2101 includes a PC 2201, and a device 2301.

The PC 2201 and the device 2301 are connected, for example, by a serial interface.

The PC 2201 is one example of an information processing apparatus.

The PC 2201 includes a CPU 2202, a memory 2203, and a switching controller 2204.

Since the CPU 2202 and the memory 2203 have functions similar to the CPU 202 and the memory 203 in the first embodiment, their descriptions are omitted.

The switching controller 2204 is a circuit for interconnecting the CPU 2202, the memory 2203, and the device 2301, and for controlling routing.

The switching controller 2204 includes a command detection circuit 2211, a pre-read request issuance circuit 2231, and a selector 2242.

The command detection circuit 2211 checks a command received from the CPU 2202, and detects a read command. If the command detection circuit 2211 detects the read command, it determines whether or not to execute a pre-read process based on the value of the PR field, and outputs a determination result to the pre-read request issuance circuit 2231. If the value of the PR field of the read command is "1", the command detection circuit 2211 determines that the pre-read process is to be executed.

Here, a format of the read command is described.

Figure 15:
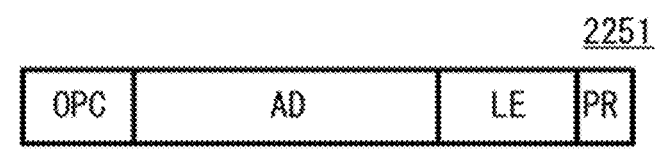

FIG. 15 illustrates the format of the read command according to the third embodiment.

The read command 2251 includes an opcode (OPC), an address (AD), a length (LE), and Pre Read (PR).

The "opcode" indicates a type of a command. For example, if a command is a read command, information indicating the read command is written as the "opcode".

The "address" indicates a read start address.

The "length" indicates a length of read data.

The "Pre Read" is a flag indicating that the pre-read process is to be executed. For example, if "1" is written to the "Pre Read", this indicates that the pre-read is to be executed.

Additionally, fields where OPC, AD, LE, and PR are written are called an OPC field, an AD field, an LE field, and a PR field, respectively.

The pre-read request issuance circuit 2231 outputs a read request for at least part of data specified by the read command.

The pre-read request issuance circuit 2231 includes a read address register 2232, and a read request generation circuit 2233.

The read address register 2232 stores a value of the AD field of the read command 2251.

The read request generation circuit 2233 receives the determination result from the command detection circuit 2211. If the determination result indicates that the pre-read process is to be executed, the read request generation circuit 2233 generates a read request for data for the pre-read starting at the value stored in the read address register 2232, and outputs the read request to the selector 2242. Assume that a length of the data for the pre-read is preset.

The selector 2242 outputs the read request received from the pre-read request issuance circuit 2231 or the device 2301 to the memory 2203.

The device 2301 receives a command from the PC 2201, and transmits the request to the PC 2201 or receives data from the PC 2201.

The device 2301 is a device for storing data, and is, for example, a magnetic disk device (hard disk drive), a semiconductor storage device or the like.

The device 2301 includes a pre-read determination circuit 2311, a request issuance circuit 2321, and a data reception circuit 2331.

The pre-read determination circuit 2311 checks the received read command, determines whether or not the pre-read process has been executed, and outputs a determination result to the request issuance circuit 2321. Whether or not the pre-read process has been executed is determined based on the value of the PR field of the received read command. For example, if "1" is written to the PR field of the received read command, the pre-read determination circuit 2311 determines that the pre-read process has been executed. Alternatively, if "0" is written to the PR field of the received read command, the pre-read determination circuit 2311 determines that the pre-read process has not been executed.

The request issuance circuit 2321 receives the read command, generates a read request according to the determination result of the pre-read determination circuit 2311, and outputs the read request to the selector 2242.

The request issuance circuit 2321 includes a first register 2322, a second register 2323, a selector 2324, and a read request generation circuit 2323.

Since the first register 2322, the second register 2323, the selector 2324, and the read request generation circuit 2325 have functions similar to the first register 1322, the second register 1323, the selector 1324, and the read request generation circuit 1325 of the first register 1322 in the second embodiment, their descriptions are omitted.

The data reception circuit 2331 receives the read data from the switching controller 2204.

FIG. 16 is a flowchart illustrating the read process according to the third embodiment.

In step S2501, the CPU 2202 issues a command. Here, assume that the CPU 2202 issues a read command as the command.

In step S2502, the command detection circuit 2211 checks the received command, and detects that the received command is the read command.

In step S2503, the command detection circuit 2211 determines whether or not to execute a pre-read process based on the value of the PR field of the received read command, and outputs a determination result to the pre-read request issuance circuit 2231. If the value of the PR field of the read command is "1", the command detection circuit 2211 determines that the pre-read process is to be executed. If the value of the PR field is not "1", the command detection circuit 2211 determines that the pre-read process is not to be executed.

If the value of the PR field is "1", a control proceeds to step S2504. If the value of the PR field is not "1", the control proceeds to step S2505.

In step S2504, the pre-read request issuance circuit 2231 reads the value (AD) of the AD field of the read command, and stores the value in the read address register 2232. The read request generation circuit 2233 reads the value stored in the read address register 2232, recognizes the read value as a read start address, generates a read request for data for the pre-read starting at the read start address, and outputs the read request to the selector 2242. The selector 2242 outputs the received read request to the memory 2203. The switching controller 2204 receives read data corresponding to the read request for the pre-read from the memory 2203, and transfers the data to the data reception circuit 2331.

In step S2505, the switching controller 2204 transmits the received read command to the device 2301.

In step S2506, the pre-read determination circuit 2311 determines whether or not the pre-read process has been executed based on the value of the PR field of the received read command, and outputs a determination result to the request issuance circuit 2321. If the value of the PR field of the read command is "1", the pre-read determination circuit 2311 determines that the pre-read process has been executed. If the value of the PR field is not "1", the pre-read determination circuit 2311 determines that the pre-read process has not been executed.

If "1" is written to the PR field (namely, the pre-read process has been executed), a control proceeds to step S2507. If "1" is not written to the PR field (namely, the pre-read process has not been executed), the control proceeds to step S2508.

In step S2507, the request issuance circuit 2321 stores the value (AD) of the AD field and the value (LE) of the LE field of the received read command respectively in the read address register and the read length register of the first register 2322.

The request issuance circuit 2321 stores a value obtained by adding the length of the data for the pre-read to the value (AD) of the AD field and a value obtained by subtracting the length of the data for the pre-read from the value (LE) of the LE field of the received read command respectively in the read address register and the read length register of the second register 2323.

The selector 2324 outputs, to the read request generation circuit 2325, the data stored in the read address register and the read length register of the second register 2323, namely, the value obtained by adding the length of the data for the pre-read to AD and the value obtained by subtracting the length of the data for the pre-read from LE.

The read request generation circuit 2325 generates a read request for data having the value obtained by adding the length of the data for the pre-read to AD and the value obtained by subtracting the length of the data for the pre-read from LE respectively as a read start address and a read data length, and outputs the read request to the selector 2242.

If the value obtained by subtracting the length of the data for the pre-read from LE is 0, this indicates that all read requests for the data specified by the read command have been generated by the switching controller 2204. Therefore, the read request generation circuit 2325 does not generate a read request.

In step S2508, the request issuance circuit 2321 stores the value (AD) of the AD field and the value (LE) of the LE field of the received read command respectively in the read address register and the read length register of the first register 2322.

The request issuance circuit 2321 stores the value obtained by adding the length of the data for the pre-read to the value (AD) of the AD field and the value obtained by subtracting the length of the data for the pre-read from the value (LE) of the LE field of the received read command respectively in the read address register and the read length register of the second register 2323.

The selector 2324 outputs the data stored in the read address register and the read length register of the first register 2322, namely, AD and LE to the read request generation circuit 2325.

The read request generation circuit 2325 generates a read request for data having AD and LE respectively as a read start address and a read data length, and outputs the read request to the selector 2242.

After step S2507 or S2508, the selector 2242 outputs the received read request to the memory 2203. Then, the switching controller 2204 receives read data requested by the read request from the memory 2203, and transfers the data to the data reception circuit 2331.

With the read process according to the third embodiment, a latency can be reduced in comparison with the conventional read process.

Additionally, with the read process according to the third embodiment, control information (Pre Read) is included in the read command, whereby execution of the read process can be controlled.

(Fourth Embodiment)

In the above described second and third embodiments, a length of data for a pre-read is preset. In contrast, a fourth embodiment refers to a case where information of a length of data for a pre-read is included in a read command issued from the CPU.

Additionally, in the third embodiment, a pre-read process is executed according to the flag that indicates whether or not to execute a pre-read process and is included in a read command. In the fourth embodiment, whether or not to execute a pre-read process is determined according to a state of a pre-read request issuance circuit or the like.

Figure 17:
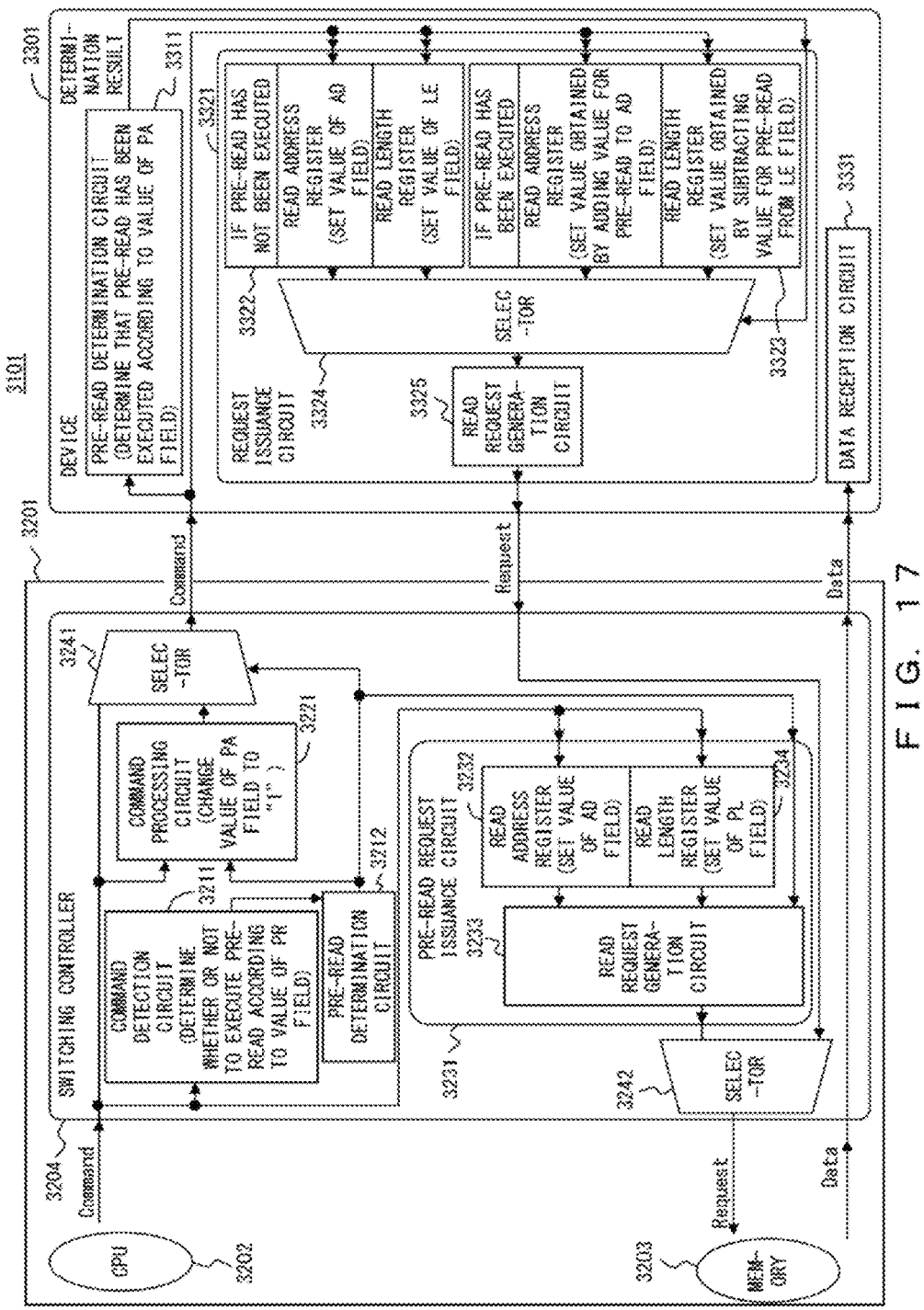
FIG. 17 is a block diagram illustrating a system according to a fourth embodiment.

FIG. 17 is a block diagram illustrating a configuration of a system according to the fourth embodiment.

The system 3103 includes a PC 3201, and a device 3301.

The PC 3201 and the device 3301 are connected, for example, by a serial interface.

The PC 3201 is one example of an information processing apparatus.

The PC 3201 includes a CPU 3202, a memory 3203, and a switching controller 3204.

Since the CPU 3202 and the memory 3203 have functions similar to the CPU 202 and the memory 203 in the first embodiment, their descriptions are omitted.

The switching controller 3204 is a circuit for interconnecting the CPU 3202, the memory 3203, and the device 3301, and for controlling routing.

The switching controller 3204 includes a command detection circuit 3211, a pre-read determination circuit 3212, a command processing circuit 3221, a pre-read request issuance circuit 3231, and selectors 3241, 3242.

The command detection circuit 3211 checks a command received from the CPU 3202, and detects a read command. If the command detection circuit 3211 detects the read command, it determines whether or not to execute a pre-read process based on the value of the PR field, and outputs a determination result to the pre-read determination circuit 3212, If the value of the PR field of the read command is "1", the command detection circuit 3211 determines that the pre-read process is to be executed.

Here, a format of the read command is described.

Figure 18:
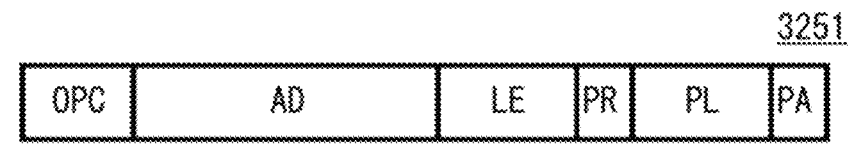

FIG. 18 illustrates the format of the read command according to the fourth embodiment.

The read command 3251 includes an opcode (OPC), an address (AD), a length (LE), Pre Read (PR), Pre read Length (PL), and Pre read Act (PA).

The "opcode" indicates a type of a command. For example, if a command is a read command, information indicating the read command is written as the "opcode".

The "address" indicates a read start address,

The "length" indicates a length of read data.

The "Pre Read" is a flag indicating that a pre-read process is to be executed. For example, if "1" is written to the "Pre Read", this indicates that the pre-read is to be executed.

The "Pre read Length" indicates the length of data read in the pre-read process.

The "Pre read Act" is a flag indicating whether or not the pre-read process has been executed. For example, if "1" is written to the "Pre read Act", this indicates that the pre-read process has been executed.

Additionally, fields where OPC, AD, LE, PR, PL, and PA are written are called an OPC field, an AD field, an LE field, a PR field, a PL field, and a PA field, respectively.

If the determination result from the command detection circuit 3211 indicates that the pre-read process is to be executed upon receipt of the determination result, the pre-read determination circuit 3212 determines whether or not to execute a pre-read. The pre-read determination circuit 3212 determines whether or not to execute the pre-read process based on a state of the switching controller 3204 (such as a state of the pre-read. request issuance circuit 3231, or the presence/absence of an error in each of the circuits). Examples of the determination method will be described later.

If the determination result from the pre-read determination circuit 3212 indicates that the pre-read process is to be executed, the command processing circuit 3221 processes the received read command. Specifically, the command processing circuit 3221 writes "1" to the PA field of the read command. Then, the command processing circuit 3221 outputs the processed read command to the selector 3241.

The pre-read request issuance circuit 3231 outputs a read request for at least part of data specified by the read command.

The pre-read request issuance circuit 3231 includes a read address register 3232, a read length register 3234, and a read request generation circuit 3233.

The read address register 3232 stores the value of the AD field of the read command 3251.

The read length register 3234 stores the value of the PL field of the read command 3251.

The read request generation circuit 3233 generates a read request for data having the value stored in the read address register 3232 and the value stored in the read length register 3234 respectively as a read start address and a read data length, and outputs the read request to the selector 3242.

The selector 3241 outputs either of the command received from the CPU 3202 or the read command (processed read command) output from the command processing circuit 3221 to the device 3301 according to the determination result from the pre-read determination circuit 3212. Specifically, if the determination result from the pre-read determination circuit 3212 indicates that the pre-read process is to be executed, the selector 3241 outputs the processed read command output from the command processing circuit 3221. If the determination result from the pre-read determination circuit 3212 indicates that the pre-read process is not to be executed, the selector 3241 outputs the command received from the CPU 3202.

The selector 3242 outputs the read request received from the pre-read request issuance circuit 3231 or the device 3301 to the memory 3203.

The device 3301 receives the command from the PC 3201, and transmits the request to the PC 3201 or receives data from the PC 3201.

The device 3301 is a device for storing data, and is, for example, a magnetic disk device (hard, disk drive), a semiconductor storage device or the like.

The device 3301 includes a pre-read determination circuit 3311, a request issuance circuit 3321, and a data reception circuit 3331.

Since the pre-read determination circuit 3311 has a function similar to the pre-read determination circuit 1311 in the second embodiment, its description is omitted.

The request issuance circuit 3321 receives the read command, generates a read request according to the determination result of the pre-read determination circuit 3311, and outputs the read request to the selector 3242.

The request issuance circuit 3321 includes a first register 3322, a second register 3323, a selector 3324, and a read request generation circuit 3325.

The first register 3322 includes a read address register and a read length register.

The read address register of the first register 3322 stores the value of the AD field of the received read command.

The read length register of the first register 3322 stores the value of the IE field of the received read command.

The second register 3323 includes a read address register and a read length register.

The read address register of the second register 3323 stores a value obtained by adding the value of the PL field to the value of the AD field of the received read command.

The read length register of the second register 3323 stores a value obtained by subtracting the value of the PL field from the value of the LE field of the received read command.

The selector 3324 outputs the data stored either in the first register 3322 or in the second register 3323 to the read request generation circuit 3325 according to the determination result of the pre-read determination circuit 3311.

Specifically, if the determination result indicates that the pre-read process has been executed, the selector 3324 outputs the data stored in the second register 3323 to the read request generation circuit 3325. If the determination result indicates that the pre-read process has not been executed, the selector 3324 outputs the data stored in the first register 3322 to the read request generation circuit 3325.

The read request generation circuit 3325 generates a read request based on the output of the selector 3324.

The data reception circuit 3331 receives the read data from the switching controller 3204.

FIG. 19 is a flowchart illustrating the read process according to the fourth embodiment.

In step S3501, the CPU 3202 issues a command. Here, assume that the CPU 3202 issues a read command as the command.

In step S3502, the command detection circuit 3211 checks the received command, and detects that the received command is a read command.

In step S3503, the command detection circuit 3211 determines whether or not to execute a pre-read process based on the value of the PR field of the received read command, and outputs a determination result to the pre-read determination circuit 3212. If the value of the PP field of the read command is "1", the command detection circuit 3211 determines that the pre-read process is to be executed. If the value of the PR field is not "1", the command detection circuit 3211 determines that the pre-read process is not to be executed.

If the value of the PR field is "1", a control proceeds to step S3504. if the value of the PR field is not "1", the control proceeds to step S3507.

In step S3503, the pre-read determination circuit 3212 determines whether or not to execute the pre-read process based on a state of the switching controller 3204. The pre-read determination circuit 3212 outputs a determination result to the pre-read request issuance circuit 3231, the command processing circuit 3221, and the selector 3241.

If the pre-read determination circuit 3212 determines that the pre-read process is to be executed, a control proceeds to step S3505. If the pre-read determination circuit 3212 determines that the pre-read process is not to be executed, the control proceeds to step S3507.

In step S3505, the pre-read request issuance circuit 3231 reads the value (AD) of the AD field of the read command, stores the value in the read address register 3232, reads the value (PL) of the PL field of the read command, and. stores the value in the read length register 3234.

The read request generation circuit 3233 generates a read request (read request for a pre-read) for data having the value stored in the read address register 3232 and the value stored in the read length register 3234 respectively as a read start address and a read data length, and outputs the read request to the selector 3242.

The selector 3242 outputs the received read request to the memory 3203. The switching controller 3204 receives read data corresponding to the read request tor the pre-read from the memory 3203, and transfers the data to the data reception circuit 3331.

In step S3506, the command processing circuit 3221 processes the read command. Specifically, the command processing circuit 3221 writes "1" to the PA field of the read command. The command processing circuit 3221 outputs the processed read command to the selector 3241. The selector 3241 outputs the processed read command to the device 3301.

In step S3507, the selector 3241 outputs the read command received from the CPU 3202 to the device 3301.

In step S3508, the pre-read determination circuit 3311 determines whether or not the pre-read process has been executed based on the value of the PA field of the received read command, and outputs a determination result to the request issuance circuit 3321. If the value of the PA field of the read command is "1", the pre-read determination circuit 3311 determines that the pre-read process has been executed. If the value of the PA field is not "1", the pre-read determination circuit 3311 determines that the pre-read process has not been executed.

If "1" is written to the PA field (namely, the pre-read process has been executed), a control proceeds to step S3509. If "1" is not written to the PA field (namely, the pre-read process has not been executed), the control proceeds to step S3510.

In step S3509, the request issuance circuit 3321 stores the value (AD) of the AD field and the value (LE) of the LE field of the received read command respectively in the read address register and the read length register of the first register 3322.

The request issuance circuit 3321 stores a value (AD+PL) obtained by adding the value (PL) of the PL field to the value (AD) of the AD field and a value (LE−PL) obtained by subtracting the value (PL) of the PL field from the value (LE) of the LE field of the received read command respectively in the read address register and the read length register of the second register 3323.

The selector 3324 outputs the data stored in the read address register and the read length register of the second register 3323, namely, AD+PL and LE−PL to the read request generation circuit 3325.

The read request generation circuit 3325 generates a read request for data having AD+PL and LB−PL respectively as a read start address and a read data length, and outputs the read request to the selector 3242.

If LE−PL is "0", this indicates that all read requests for the data specified by the read command have been generated by the switching controller 3204. Therefore, the read request generation circuit 3325 does not generate a read request.

In step S3510, the request issuance circuit 3321 stores the value (AD) of the AD field and the value (LE) of the LE field of the received read command respectively in the read address register and the read length register of the first register 3322.

The request issuance circuit 3321 stores the value (AD+PL) obtained by adding the value (PL) of the PL field to the value (AD) of the AD field and the value (LE−PL) obtained by subtracting the value (PL) of the PL field from the value (LE) of the LE field of the received read command respectively in the read address register and the read length register of the second register 3323.

The selector 3324 outputs the data stored in the read address register and the read length register of the first register 3322, namely, AD and LE to the read request generation circuit 3325.

The read request generation circuit 3325 generates a read request for data having AD and LB respectively as a read start address and a read data length, and outputs the read request to the selector 3242.

After step S3509 or S3510, the selector 3242 outputs the received read request to the memory 3203. Then, the switching controller 3201 receives the read data requested by the read request from the memory 3203, and transfers the data to the data reception circuit 3331.

With the read process according to the fourth embodiment, the latency can be reduced in comparison with the conventional read process.

Additionally, with the read process according to the fourth embodiment, a length of data for a pre-read can be controlled with a read command.

Furthermore, with the read process according to the fourth embodiment, execution of a read process can be controlled based on a state of the switching controller.

Examples of the method by which the pre-read determination circuit 3212 determines whether or not to execute a pre-read process are described next.

The following three examples of the method for determining whether or not to execute a pre-read process are described.

(1) Determination Based on a State of the Pre-Read Request Issuance Circuit

Figure 20:
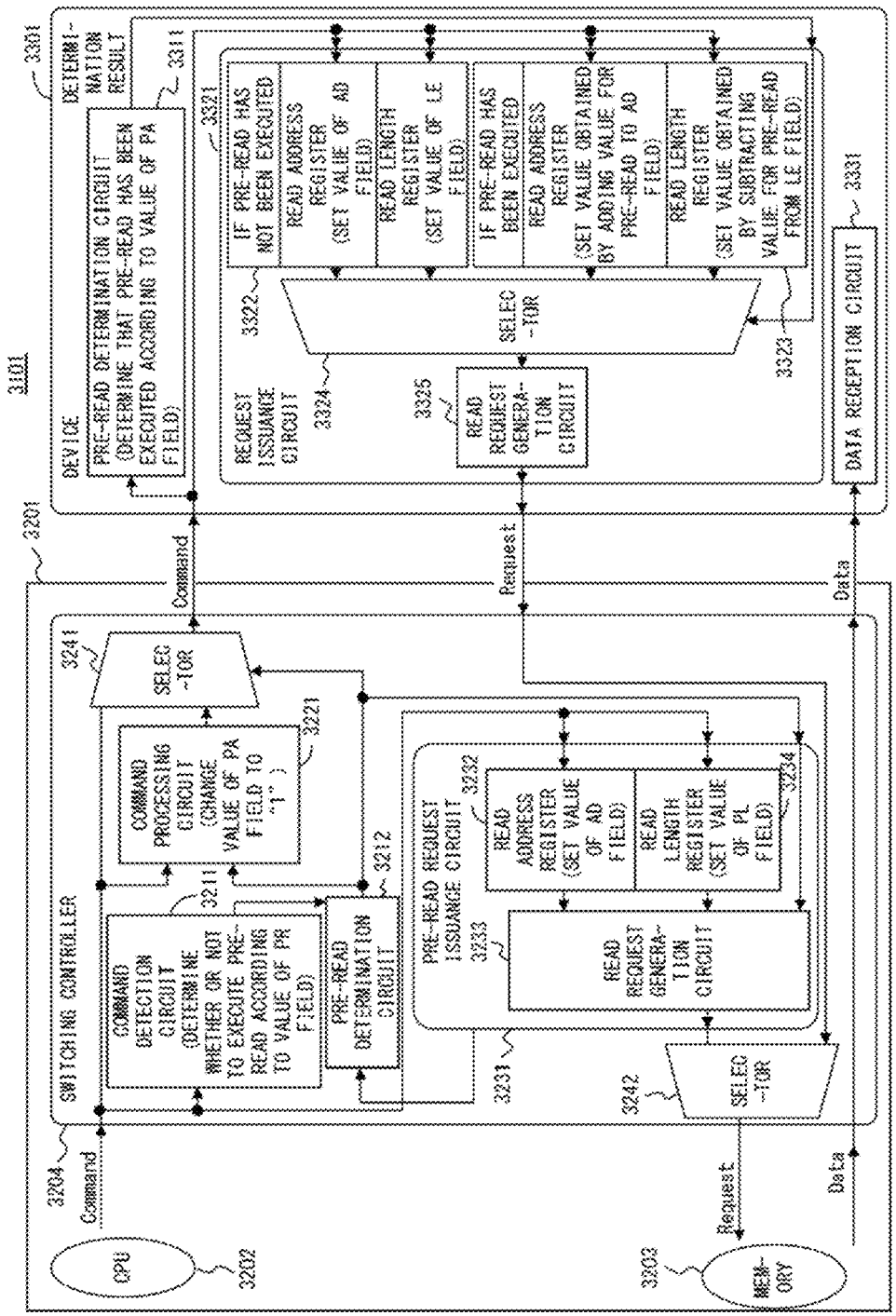
FIG. 20 is a block diagram illustrating a first modification example of the system according to the fourth embodiment.

FIG. 20 is a block diagram illustrating a first modification example of the system according to the fourth embodiment.

The pre-read request issuance circuit 3231 according to the first modification example outputs a state signal indicating a state of the pre-read request issuance circuit 3231 to the pre-read determination circuit 3212. Specifically, the pre-read request issuance circuit 3231 outputs a state signal indicating a BUSY state, if the pre-read request issuance circuit 3231 can not execute a new pre-read process immediately, for example, if the pre-read request issuance circuit 3231 is executing a pre-read process, or if empty areas of the read, address register 3232 and the read length register 3234 are small.

The pre-read determination circuit 3212 determines whether or not to execute a pre-read process based on the state signal. Specifically, the pre-read determination circuit 3212 determines that the pre-read process is not to be executed if the state signal indicates the BUSY state.

For example, there is a case where a new pre-read process cannot be immediately executed because the pre-read request issuance circuit 3231 is executing another pre-read process.

In this case, a latency further increases if the new pre-read process is waited to be executed until the currently executed pre-read process is terminated.

Accordingly, the problem that the latency further increases can be avoided by making the determination based on the above described state signal.

(2) Determination Based on a Control Register

Figure 21:
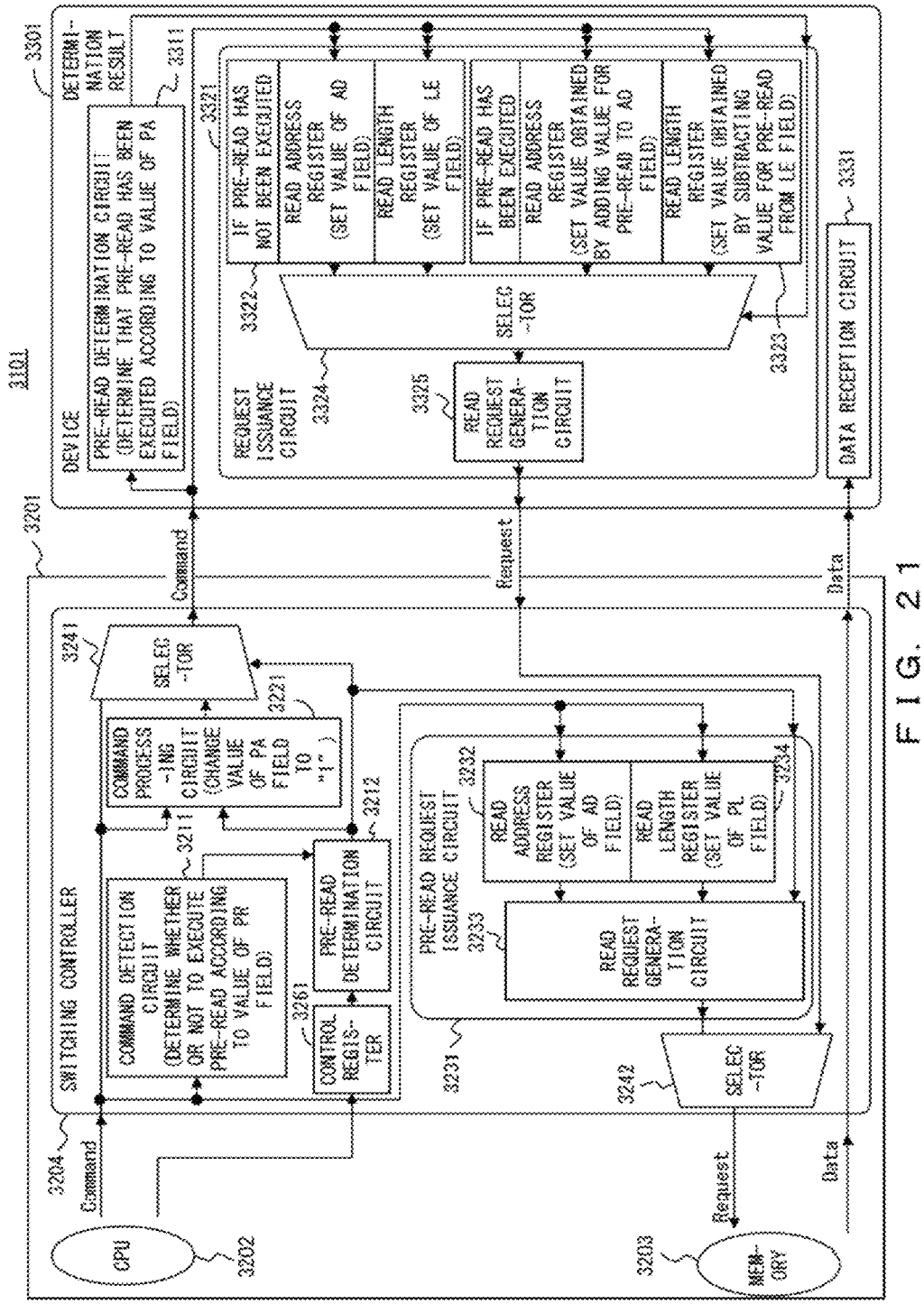
FIG. 21 is a block diagram illustrating a second modification example of the system according to the fourth embodiment.

FIG. 21 is a block diagram illustrating a second modification example of the system according to the fourth embodiment.

The switching controller 3204 according to the second modification example further includes a control register 3261.

The control register 3261 stores control information indicating whether or not to execute a pre-read process. The control information is written according to a control signal from the CPU 3202.

The pre-read determination circuit 3212 references the control information stored in the control register 3261, and determines whether or not to execute a pre-read process based on the control information.

Assume that there is a system, where a PC includes a plurality of switching controllers, which are connected in multiple stages.

Also assume that a restriction is desired to be placed not to execute a pre-read process only for a particular path (namely, a particular switching controller) in the system in consideration of the performance of the system.

In this case, control information indicating that a pre-read process is not to be executed for a control register of the particular switching controller is written. This can prevent the pre-read process from being executed for the particular path (namely, the particular switching controller).

The switching controller according to the second modification example is used, whereby a switching controller that executes or does not execute a pre-read process can be arbitrarily set as described above.

(3) Determination Based on an Error Check

Figure 22:
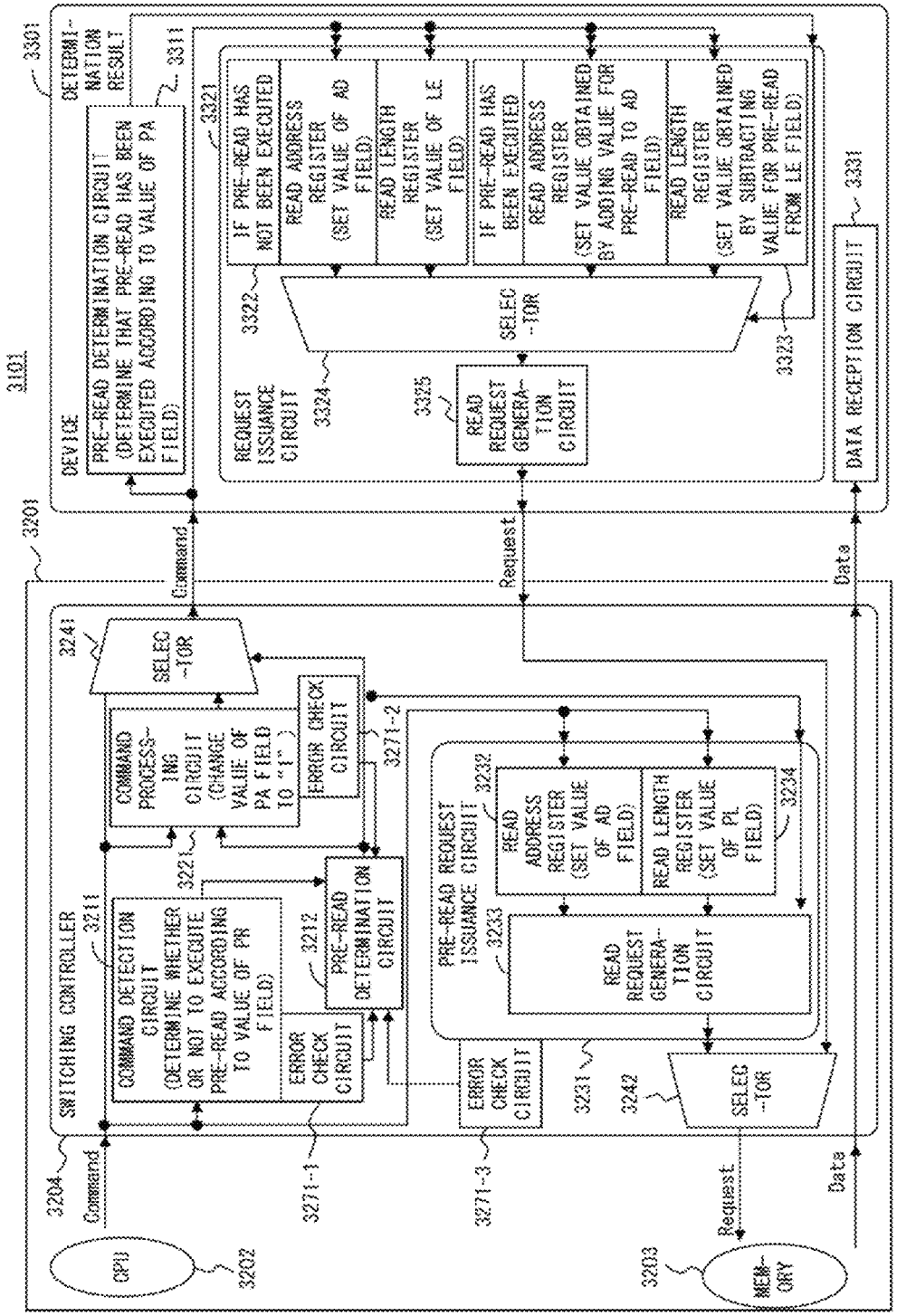
FIG. 22 is a block diagram illustrating a third modification example of the system according to the fourth embodiment.

FIG. 22 is a block diagram illustrating a configuration of a third modification example of the system according to the fourth embodiment.

The switching controller 3204 according to the third modification example further includes error check circuits 3271-i (i=1 to 3).

The error check circuit 3271-1 checks whether or not there is an error in operations or output data of the command detection circuit 3211. If the error check circuit 3271-1 detects an error, it outputs an error detection signal to the pre-read determination circuit 3212.

The error check circuit 3271-2 checks whether or not there is an error in operations or output data of the command processing circuit 3221. If the error check circuit 3271-2 detects an error, it outputs an error detection signal to the pre-read determination circuit 3212.

The error check circuit 3271-3 checks whether or not there is an error in operations or output data of the pre-read request issuance circuit 3231. If the error check circuit 3271-3 detects an error, it outputs an error detection signal to the pre-read determination circuit 3212.

The pre-read determination circuit 3212 determines that the pre-read process is not to be executed if it receives the error detection signal from any of the error check circuits 3271-1 to 3271-3.

There are cases where an error occurs in the operations or the output data of any of the circuits of the switching controller due to an influence such as an alpha ray or degradation of a material.

In the third modification example, the switching controller 3204 executes not a pre-read process but a normal process if an error is detected from the operations or the output data of any of the circuits (the command detection circuit, the command processing circuit, and the pre-read request issuance circuit), which are related to the pre-read process.

By determining whether or not to execute a pre-read process based on an error check as described above, the reliability of the system is improved.

The third modification example is preferable, by way of example, for a backbone system that demands high reliability.

In the above described embodiments, the device is connected to the PC. However, the PC may include the device by installing the device within the PC.

All examples and conditional language provided herein are intended for pedagogical purposes of aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
    a processor configured to issue a read command to a device;
    a memory configured to store data; and
    a switching controller configured to connect the processor, the memory, and the device, wherein
    the switching controller comprises
        a command detection circuit configured to detect the read command issued from the processor,
        a command processing circuit configured to process the read command, and to output the processed read command, and
        a pre-read request issuance circuit configured to generate a read request for a pre-read data which is a part of data within specified data specified by the read command, and to transmit the read request to the memory, and
    the switching controller receives the pre-read data read from the memory according to the read request, and transmits the pre-read data to the device in advance of transmitting remaining data which is data excluded the pre-read data from the specified data.

2. The information processing apparatus according to claim 1, wherein the command processing circuit writes, to the read command, pre-read execution information indicating that a pre-read process for reading the pre-read data has been executed.

3. The information processing apparatus according to claim 1, further comprising:
    a first pre-read process determination circuit configured to determine whether or not to execute a pre-read process for reading the pre-read data, wherein
    the read command includes pre-read instruction information indicating whether or not to execute the pre-read process,
    the command detection circuit determines whether or not to execute the pre-read process based on the pre-read instruction information,
    the first pre-read process determination circuit determines whether or not to execute the pre-read process based on a state of the switching controller if the command detection circuit determines that the pre-read process is to be executed, and
    the command processing circuit writes, to the read command, pre-read execution information indicating that the pre-read process has been executed if the first pre-read process determination circuit determines that the pre-read process is to be executed.

4. The information processing apparatus according to claim 3, wherein the first pre-read process determination circuit determines whether or not to execute the pre-read process based on a state of the pre-read request issuance circuit.

5. The information processing apparatus according to claim 3, wherein the switching controller further comprises a control register configured to store control information indicating whether or not to execute the pre-read process, and
    the first pre-read process determination circuit determines whether or not to execute the pre-read process based on the control information.

6. The information processing apparatus according to claim 3, wherein
    the switching controller further comprises an error check circuit configured to detect an error of operations or output data of the command detection circuit, the command processing circuit, or the request issuance circuit, and
    the first pre-read process determination circuit determines whether or not to execute the pre-read process based on a detection result of the error check circuit.

7. The information processing apparatus according to claim 3, wherein the switching controller further comprises a selector configured to output the processed read command if the first pre-read process determination circuit determines that the pre-read process is to be executed, and to output the read command if the first pre-read process determination circuit determines that the pre-read process is not to be executed.

8. An information processing apparatus comprising:
    a processor configured to issue a read command to a device;
    a memory configured to store data; and a switching controller configured to connect the processor, the memory, and the device, wherein the switching controller comprises
- a command detection circuit configured to detect the read command issued from the processor,
- a command processing circuit configured to process the read command, and to output the processed read command, and
- a pre-read request issuance circuit configured to generate a read request for at least part of data within data specified by the read command, and to transmit the read request to the memory, the switching controller receives the part of the data from the memory, and transmits the part of the data to the device, and the device comprises
- a second pre-read process determination circuit configured to check a received read command, and to determine whether or not the pre-read process for requesting the part of the data has been executed, and
- a request issuance circuit configured to generate a different read request for data other than the part of the data within the data specified by the received read command, and to transmit the different read request to the switching controller if the second pre-read process determination circuit determines that the pre-read process has been executed.

9. A control method executed by an information processing apparatus including a processor configured to issue a read command to a device, a memory configured to store data, and a switching controller configured to connect the processor, the memory, and the device, the method comprising:

detecting the read command issued from the processor;
processing the read command;
outputting the processed read command to the device;
generating a read request for a pre-read data which is a part of data within specified data specified by the read command;
transmitting the read request to the memory;
receiving the pre-read data read from the memory according to the read request; and
transmitting the pre-read data to the device in advance of transmitting remaining data which is data excluded the pre-read data from the specified data.

10. A control method executed by an information processing apparatus including a processor configured to issue a read command to a device, a memory configured to store data, and a switching controller configured to connect the processor, the memory, and the device, the method comprising:

detecting the read command issued from the processor;
processing the read command;
outputting the processed read command to the device;
generating a read request for at least part of data within data specified by the read command;
transmitting the read request to the memory;
receiving the part of the data from the memory; and
transmitting the part of the data to the device, wherein
the information processing apparatus further comprises the device, and
the device checks a received read command, determines whether or not a pre-read process for requesting the part of the data has been executed, generates a different read request for data other than the part of the data within the data specified by the received read command if the device determines that the pre-read process has been executed, and transmits the different read request to the switching controller.

* * * * *